United States Patent [19]
Morinaga et al.

[11] 4,330,801
[45] May 18, 1982

[54] TAPE RECORDER

[75] Inventors: Kaoru Morinaga; Takamasa Kurafuzi, both of Yokohama, Japan

[73] Assignee: Tokyo Shibaura Denki Kabushiki Kaisha, Kawasaki, Japan

[21] Appl. No.: 128,312

[22] Filed: Mar. 7, 1980

[30] Foreign Application Priority Data

Mar. 16, 1979 [JP] Japan .................. 54-30787
Mar. 16, 1979 [JP] Japan .................. 54-30789
Mar. 16, 1979 [JP] Japan .................. 54-30790
Mar. 16, 1979 [JP] Japan .................. 54-33986[U]

[51] Int. Cl.³ ............ G11B 15/44; G11B 19/26; G11B 27/22
[52] U.S. Cl. ................... 360/69; 360/74.4; 360/137
[58] Field of Search ........... 360/69, 137, 72.2, 74.4; 242/198, 206, 207–208, 209–210

[56] References Cited
U.S. PATENT DOCUMENTS 4,194,229 3/1980 Yamamoto et al. .............. 360/69

4,228,472 10/1980 Magata et al. .................. 360/74.4

FOREIGN PATENT DOCUMENTS 52-47702 2/1977 Japan .................. 360/137
52-47705 4/1977 Japan .................. 360/137

Primary Examiner—Alfred H. Eddleman
Attorney, Agent, or Firm—Cushman, Darby & Cushman

[57] ABSTRACT

A tape recorder has an automatic repeating function, and includes a switching lever (435) displaceable between a first position to render a rewinding mechanism operable and a reproduction driving mechanism inoperable, and a second position to render said fast feeding mechanism inoperable and said reproduction driving mechanism operable, a rotary body (281) for operably connecting with said switching lever so as to perform said displacement of the switching lever by its torque and to rotate independently of the tape travel, and an automatic stop detection mechanism (39) for detecting the end of a tape so as to displace the switching lever from the second position to the first position.

8 Claims, 31 Drawing Figures

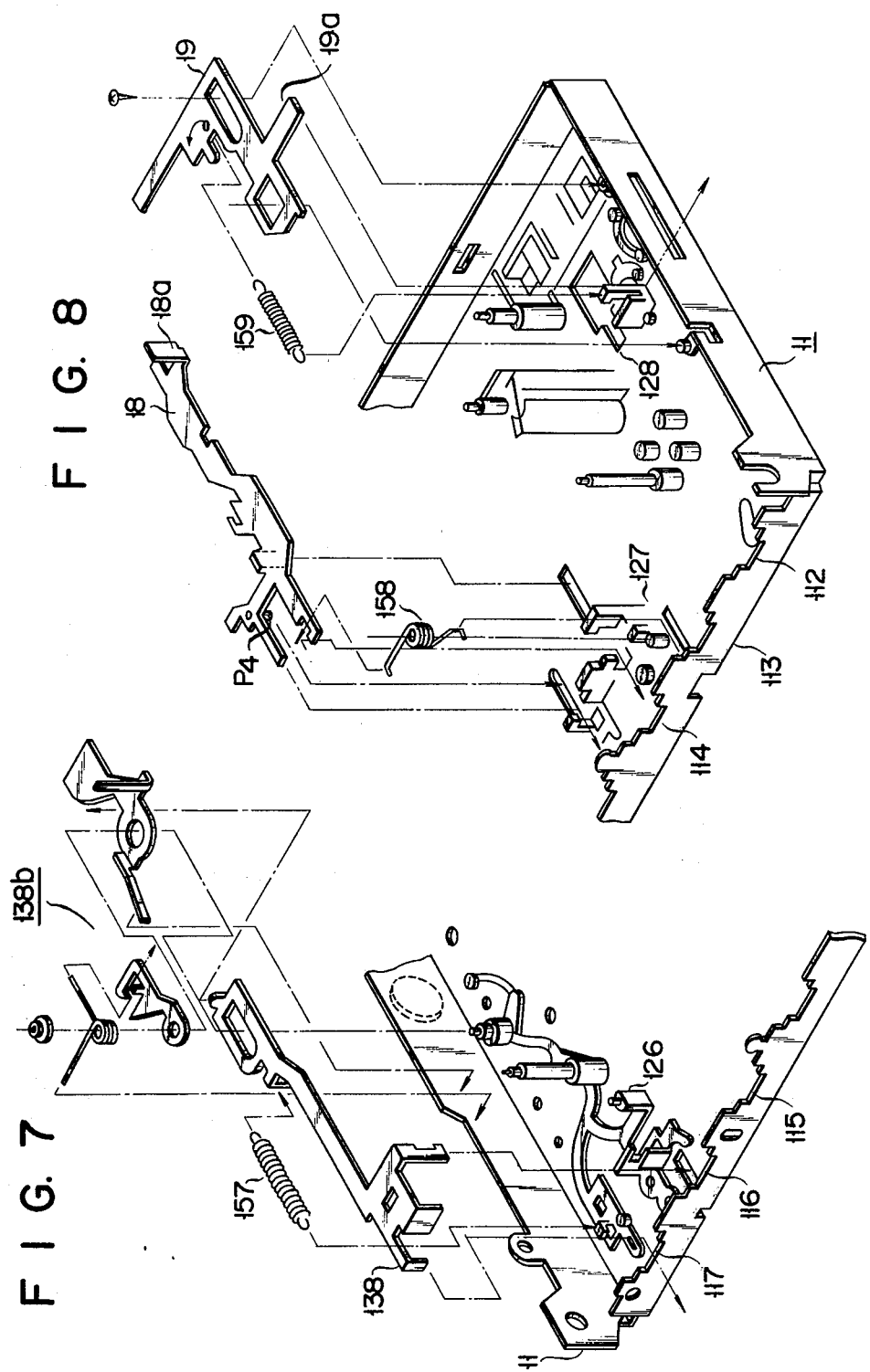

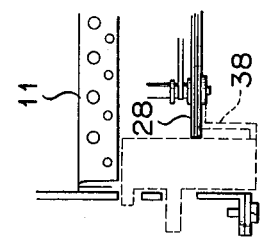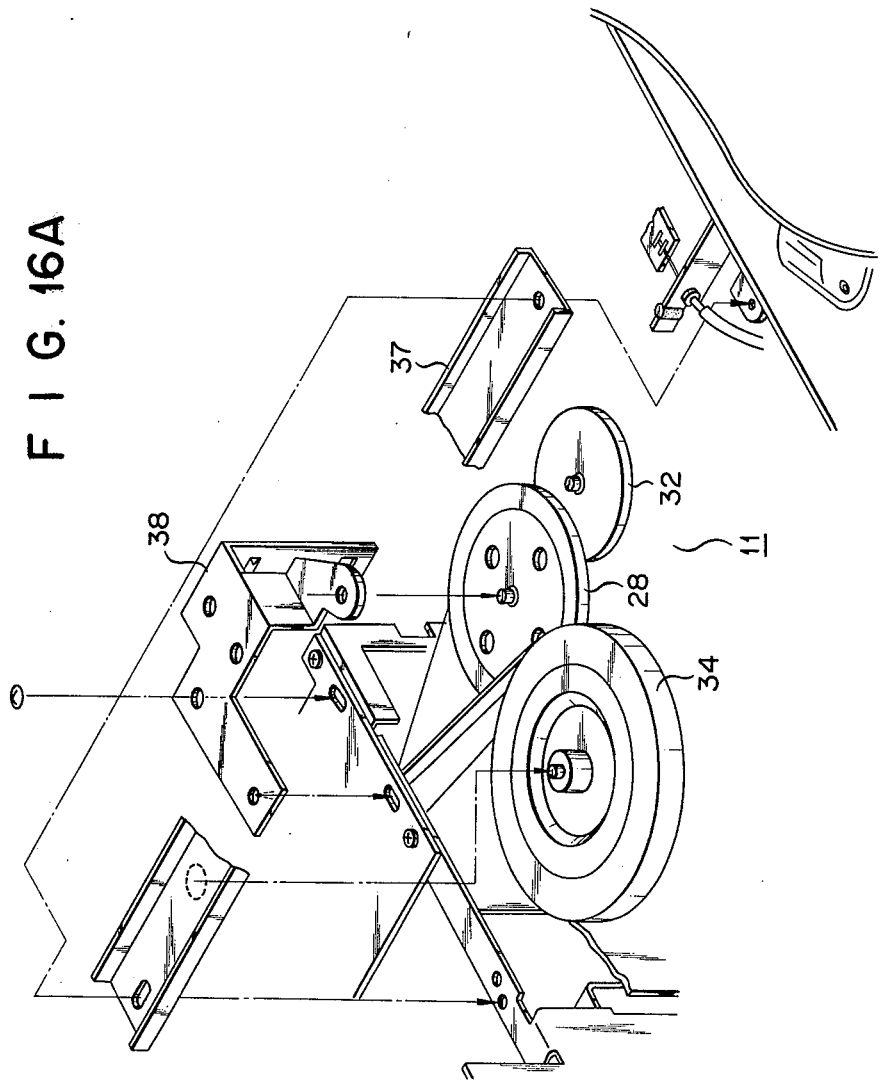

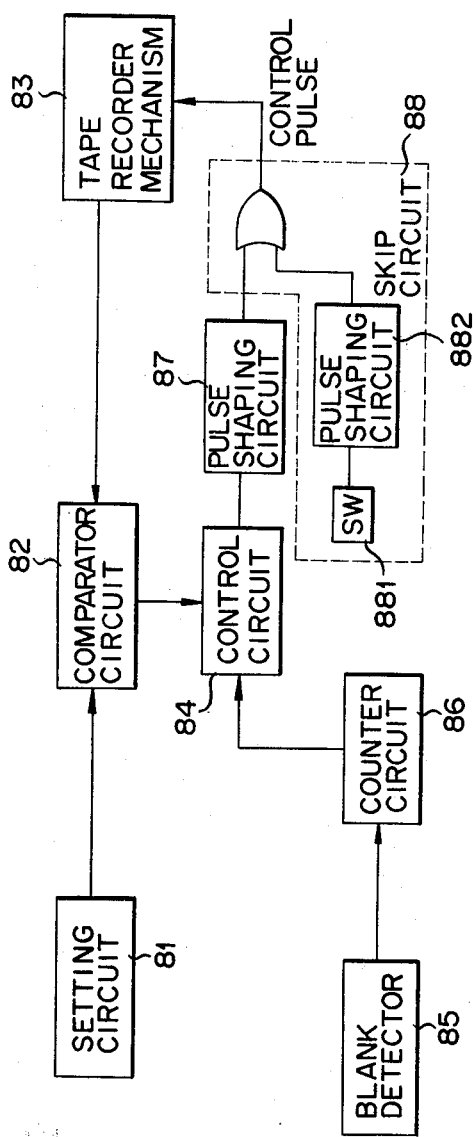
F I G. 21
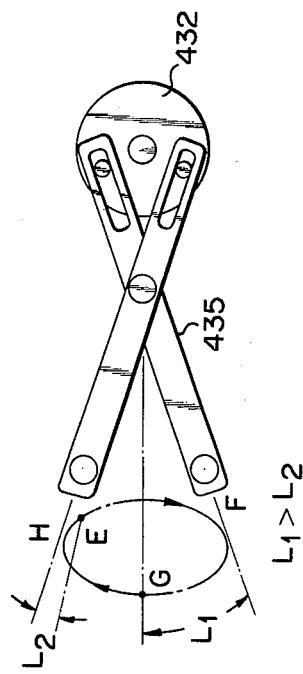
F I G. 22

F I G. 23C
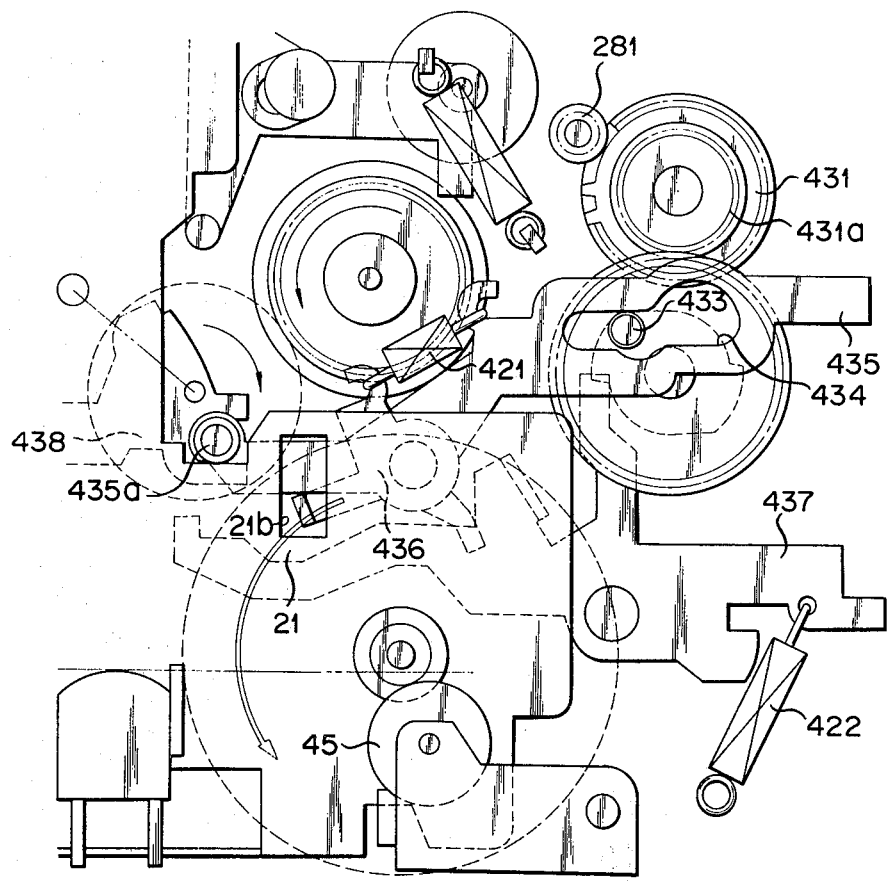

TAPE RECORDER

BACKGROUND OF THE INVENTION

This invention relates to a multi-functional tape recorder and particularly to a tape recorder with a program reproducing mechanism.

It is desirable for a tape recorder to perform various programmed functions, such as an automatic repeating function and a recording back quick selection function.

The various functions of such a tape recorder may be electronically (electrically) or mechanically controlled; both have advantages and disadvantages. If portableness is to be considered, mechanical control is better, since then there is lower power consumption, and compactness in size and lightness in weight may be attained. An electronic (electric) control system would require many motors or solenoid plungers resulting in disadvantages, because the power consumption necessarily increases, the size and weight become greater, and the manufacturing cost becomes higher.

On the other hand, a mechanical type multi-functional tape recorder is not desirable if it involves a complex mechanism or operation. It is desired that the tape recorder be simple in construction and easy to operate.

SUMMARY OF THE INVENTION

One of the objects of this invention is to provide a tape recorder with an improved program reproduction mechanism which is simple in construction, multi-functional, and easy to operate.

The program reproducing function used in this invention is a multi-data selection reproducing function, such as selective reproduction by a tape recorder of several pieces of music (songs). In order to perform such a program reproducing function mechanically, this invention provides an improved program reproduction mechanism which is simple in construction, suitable for multi-functional purposes and easy to operate, by organically constituting it as a program control mechanism for a switching operating mode which is driven, in the case of a tape recorder, for example, by the motor which is the driving source of the tape driving mechanism.

In an aspect of the present invention there is provided a tape recorder comprising a tape reel driving mechanism; a reproduction driving mechanism and a fast feeding driving mechanism capable of being operably connected to said tape reel driving mechanism; a reproduction operation member and a fast feeding operation member which respectively operate said reproduction driving mechanism and said fast feeding driving mechanism and which are displaceable from inoperable positions to operable positions for performing a reproducing operation and a fast feeding operation; a locking mechanism for locking both of said operation members at operable positions; a tape travel mechanism for facilitating tape travel; and control means for automatically operably connecting, by a selective outside signal, said reproduction driving mechanism and said fast feeding driving mechanism with said tape reel driving mechanism; control means including a switching member displaceable between a first position to render said fast feeding driving mechanism operable and said reproduction driving mechanism inoperable and a second position to render said fast feeding driving mechanism inoperable and said reproduction driving mechanism operable; a rotary body for operably connecting with said switching member so as to perform said displacement of said switching member by its torque and to rotate independently of the tape travel; and an operating mechanism for said switching member with a control mechanism for displacing said switching member by said outside signal in cooperation with said rotary body.

BRIEF DESCRIPTION OF THE DRAWINGS

FIGS. 5-8 are exploded perspective views illustrating each operation plate of the operation mechanism;

FIG. 12A is a perspective view illustrating the entire mechanism; FIG. 12B is a top view; and FIG. 13 is an exploded perspective view of the take-up slider and the take-up idler;

FIGS. 16A and 16B are, respectively, an exploded perspective view and a side view illustrating the manner in which the flywheel and the intermediate pulley are mounted;

FIG. 21 is a flow chart illustrating the electrical system of a control mechanism for a multi-data selective reproduction function of a tape recorder;

FIG. 22 is a view illustrating the magnitude of an over stroke of the control mechanism for the multi-data selective reproduction function of a tape recorder; and FIGS. 23A-23C are top views, each illustrating different conditions of a mechanism for performing an automatic repeat function: FIG. 23A shows the PLAY operation position; FIG. 23B shows the process of switching from a PLAY operation to a cueing operation; and FIG. 23C shows the cueing operation condition.

DESCRIPTION OF THE PREFERRED EMBODIMENT

An embodiment of a cassette tape recorder based upon this principle will be described with reference to the accompanying drawings.

Figure 1:
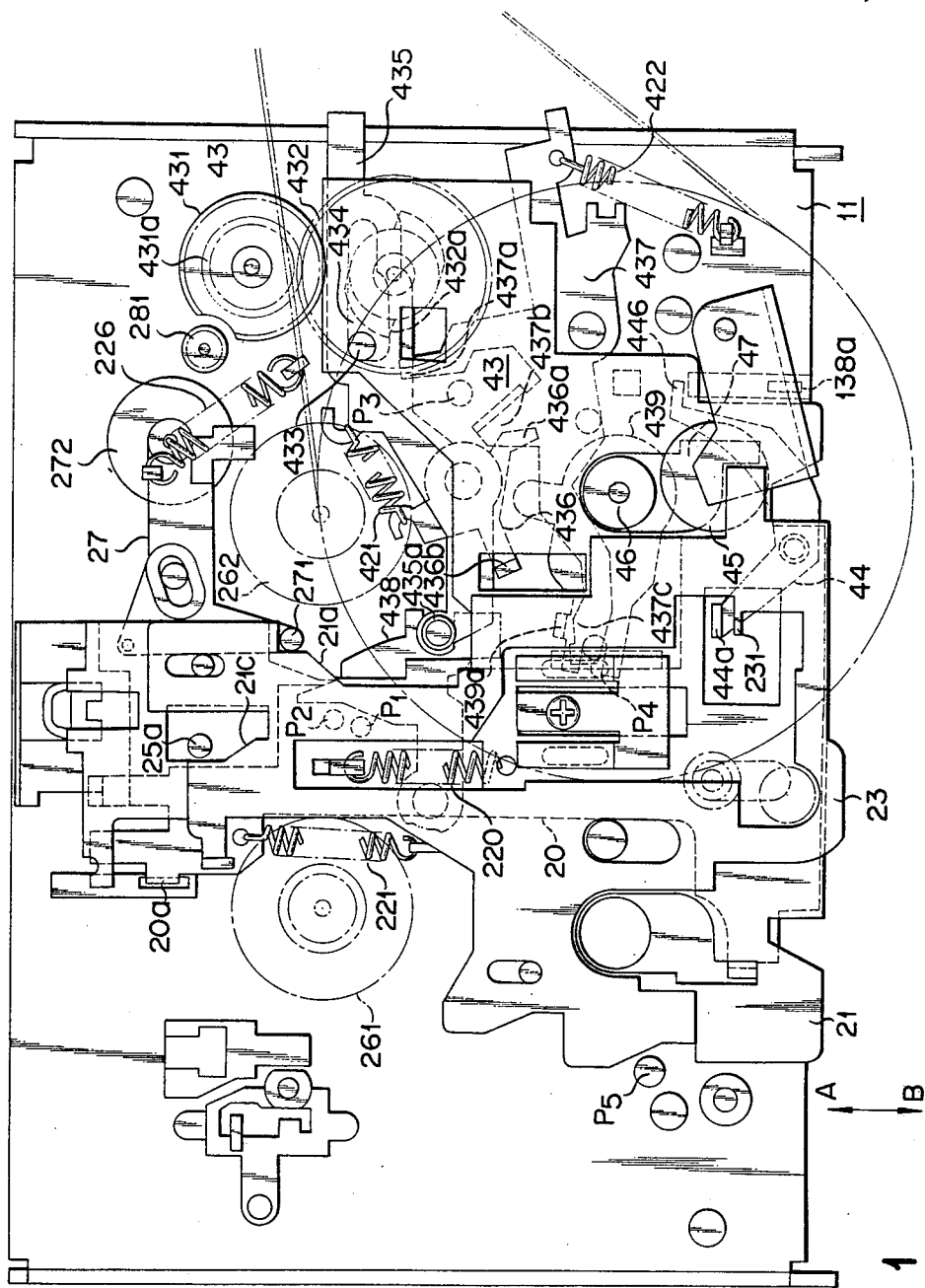
FIG. 1 is a top view illustrating a mechanism located at the upper portion of the main chassis of a tape recorder according to one embodiment of this invention.
Figure 2:
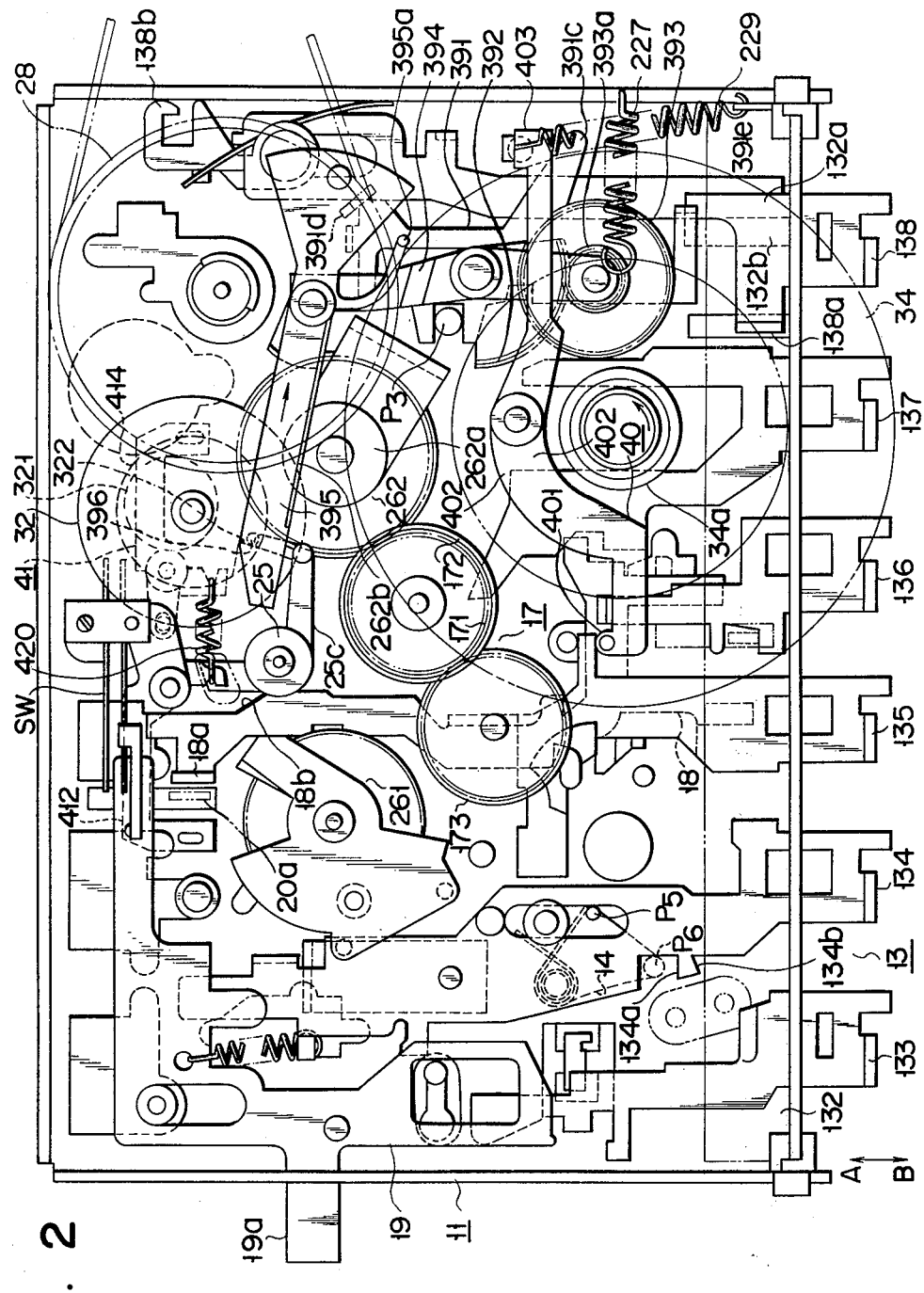
FIG. 2 is a top view illustrating a mechanism located at the lower part of the main chassis of the same tape recorder with the main chassis cut away.

FIG. 1 is a top view of each mechanism disposed on a main chassis 11, and FIG. 2 is a perspective view from the top of each mechanism disposed below the main chassis 11, the flat portion of the main chassis 11 being omitted for illustration purposes.

Figure 3:
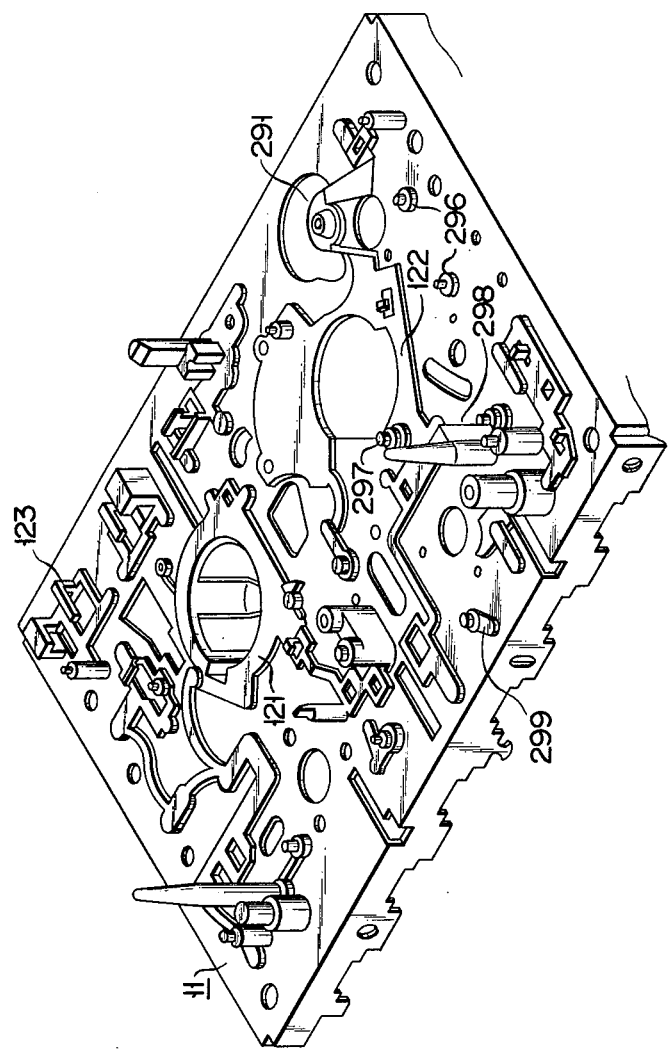
FIG. 3 is an exploded perspective view illustrating the main chassis with mounting portions formed thereon.

Various mechanisms to be described hereinafter are formed, in advance, on the metallic main chassis 11 by the so-called plastic outsertion method as shown in FIG. 3. There are various mounting parts (boss-shaped, pin-shaped, guide-shaped and so on) such as reel base mounting parts 121 and 122, an erroneous erasure prevention lever mounting part 123, and so on. These parts are mounted so that they are integral with the main chassis 11, and they will be described hereinafter as needed.

Figure 4:
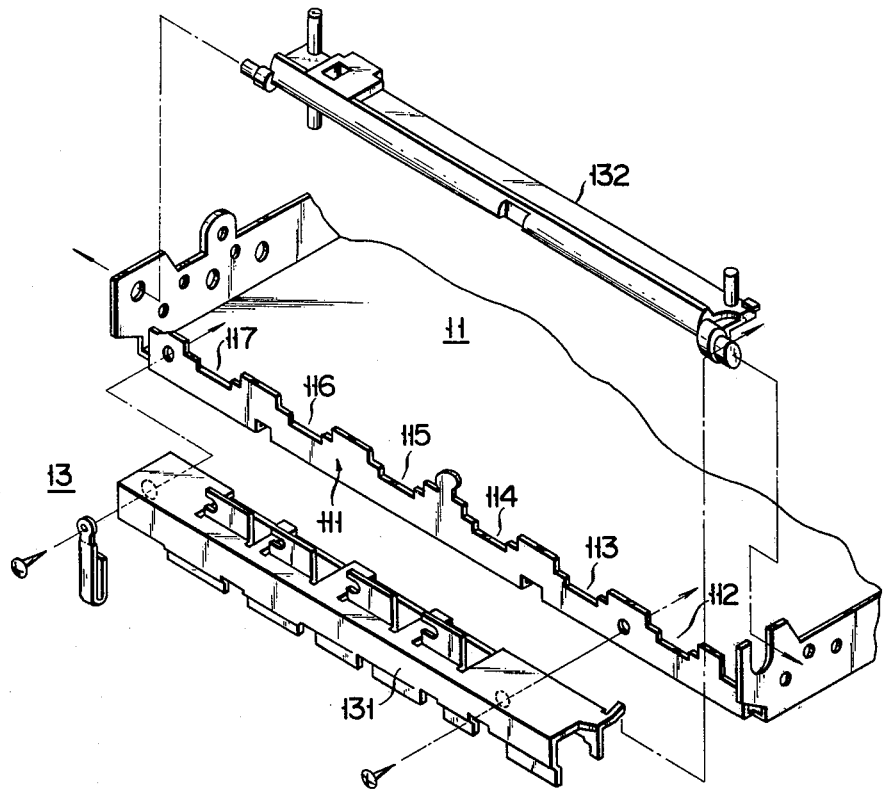
FIG. 4 is an exploded perspective view illustrating a holding tool and a locking plate of an operation mechanism.

An operating mechanism 13 is first mounted on the main chassis 11. Cutaway portions 112 to 117 are formed in one extension 111 of the main chassis 11 at predetermined intervals, as shown in FIG. 4. A stop operation plate 133, an REC operation plate 134, an REW operation plate 135, a PLAY operation plate 136, an FF operation plate 137, and a pause operation plate 138 (omitted in FIG. 1), shown in FIG. 2, are slidably mounted to these cutaway portions 112 to 117 so that they engage with a metal fitting 131 holding the operation plate (omitted) in FIGS. 1 and 2) mounted outside the main chassis 11 and with a locking plate 132 pivotally supported at the lower inner part below the main chassis 11.

Figure 5:
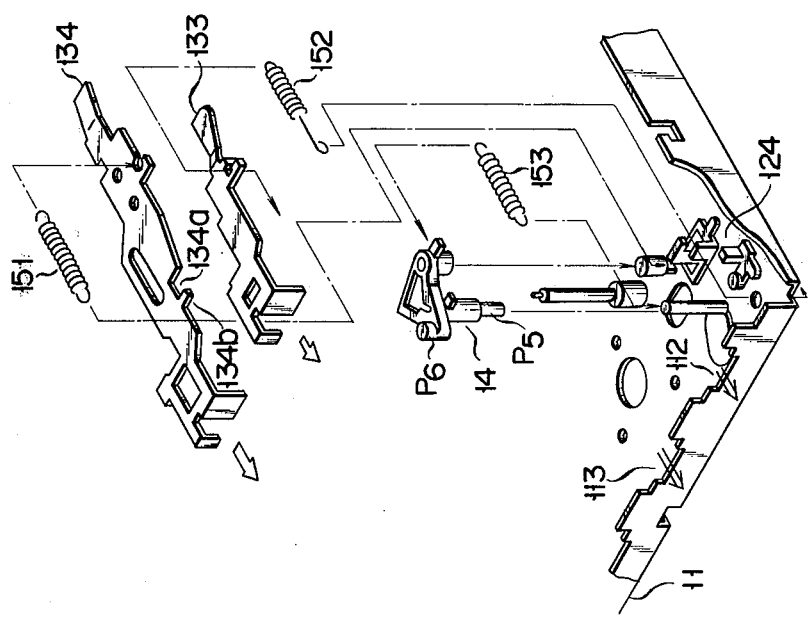

As shown in FIG. 5, the STOP operation plate 133 and the REC operation plate 134 are pivotally mounted on a mounting portion 124 attached by the plastic outsertion method to the lower part of the main chassis 11. Tension springs 152 and 151, respectively, exert predetermined biasing forces on them. An erroneous recording prevention lever 14 is mounted on the mounting portion and biased for unidirectional pivotal movement by a spring 153.

Figure 6:
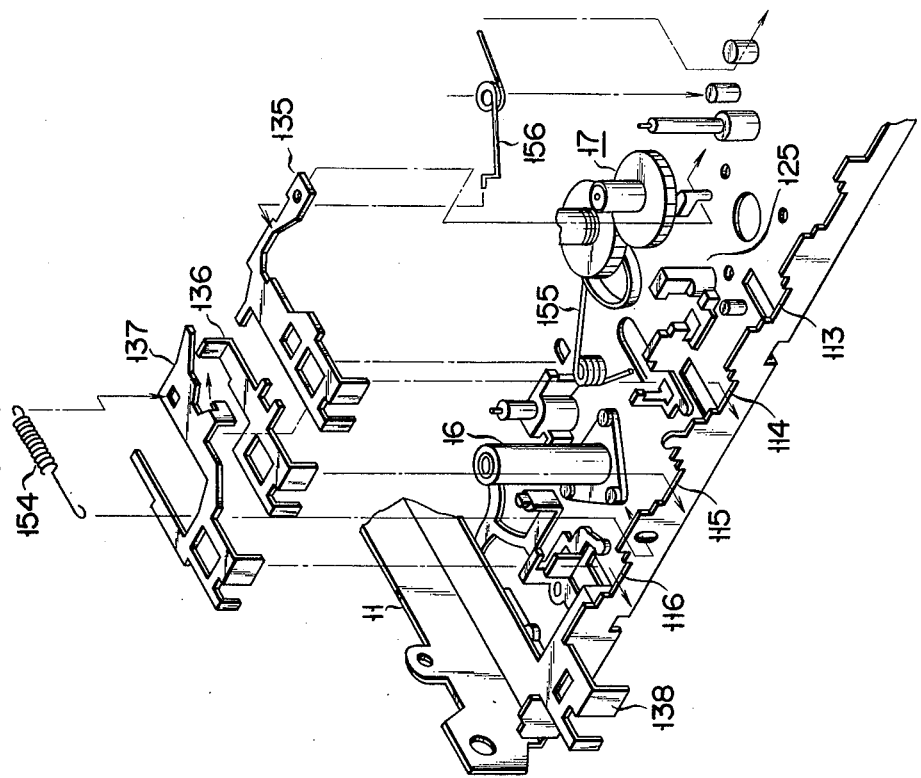

The REW operation plate 135, the PLAY operation plate 136 and the FF operation plate 137, as shown in FIG. 6, engage with a mounting portion 125 which, in turn, is attached to the lower part of the main chassis 11 by the plastic outsertion method. They are biased with predetermined forces by springs 154–156, respectively. In this figure, numeral 16 denotes a bearing of a capstan 46 coaxial with a flywheel 34, attached to the lower part of the main chassis 11, to be explained later. Numeral 17 denotes a high speed mechanism.

A pause operation plate 138, as shown in FIG. 7, engages with a mounting part 126 which, in turn, is attached to the lower part of the main chassis 11 by the plastic outsertion method. The pause operation plate 138 has at its rear side a push-push mechanism 138b and is attached to the mounting part 126 through a spring 157.

The operating mechanism 13 constructed in the abovementioned manner is manipulated in the direction A of FIG. 2 by means of piano-touch keys or conventional push buttons (not shown) attached to the end of each of the operating plates 133 to 138, and is returned in the direction B by each biasing force. The operating mechanism 13 is selectively connected to each driving system so that the tape recorder mechanism is operated in the desired manner. In this case, each operation plate (excluding the STOP operation plate and the pause operation plate) is locked in a pressed position during a pressing operation by engaging with the locking plate 132. Each operation plate is so constructed that a plurality of operation plates can be locked substantially simultaneously in composite operations such as the automatic repeating function and the program reproduction (music selection) function. Since this type of locking mechanism is well known in the art of manufacturing tape recorder mechanisms, no further description of it will be made.

The STOP operation plate 133 also includes an ejection function as in conventional cases. In operation, the STOP operation plate 133 itself is not locked. It engages with the locking plate 132 so as to release the other locked operation plates (excluding the pause operation plate), upon a first pressing operation, and to perform the ejection function upon a second pressing operation.

The pause operation plate 138 operates independently of the locking plate 132. By the known push-push mechanism 138b included therein, it is locked, upon a first pressing operation, in a depressed position so as to temporarily interrupt, for example, the reproducing operation; and it is released from its locked condition upon a second pressing operation so as to return to, for example, the reproducing operation.

As shown in FIG. 8, a switch slider 18 is slidably connected to a plastic outserted part 127 at the central lower part of the main chassis 11 through a predetermined biasing force exerted by a spring 158 so as to operate in cooperation with the REW and FF operation plates 135 and 137. A selection lever 19 engages pivotally and slidably with a plastic outserted mounting part 128 at the rear end of the lower part of the main chassis 11 through a predetermined biasing force exerted by a spring 159. The pointed end of the selection lever 19 is detachable from the STOP operation plate 133, and one end 19a protrudes from a side groove in the main chassis 11.

The switch slider 18 operates while the REW operating plate 135 and the FF operation plate 137 are operating, and another switch slider 20, to be explained hereinafter, operates while the PLAY operation plate 136 is operating, so that each rear extension 18a and 20a of the switch sliders turns on a power source leaf switch SW disposed behind the main chassis 11. Power is supplied, (excluding the case wherein the motor power source comprises another system) to a motor (not shown), thereby driving the tape recorder at a high speed (for rewinding and fast forwarding) or at a constant speed. In this case, both the extensions 18a and 20a are detachably engaged with the rear end of the selection lever 19 so that, when they are engaged by the pressing operation of the pressing plates 135, 136 and 137, the selection lever 19 is pivoted in the counterclockwise direction of FIG. 2 and disengages the STOP operation plate 133. This effectively separates the STOP function and the ejection function of the STOP operation plate 133 for the prevention of any undesirable circumstances, since the STOP operation plate 133 also includes the ejection function. That is, if the STOP operation plate 133 is pressed while any of the operation plates 135–137 is in operation, it performs its STOP function and is released from its locked condition. If the STOP operation plate 133 is pressed while none of the operation plates 135-139 in operation and they are under the stopped condition, it performs its ejection function through the selection lever 19. This ejection function is accomplished by backwardly sliding the selection lever 19 and operating an ejection mechanism (not shown) by the projecting end 19a when the selection lever 19 and the STOP operation plate 133 are engaged.

Figure 9:
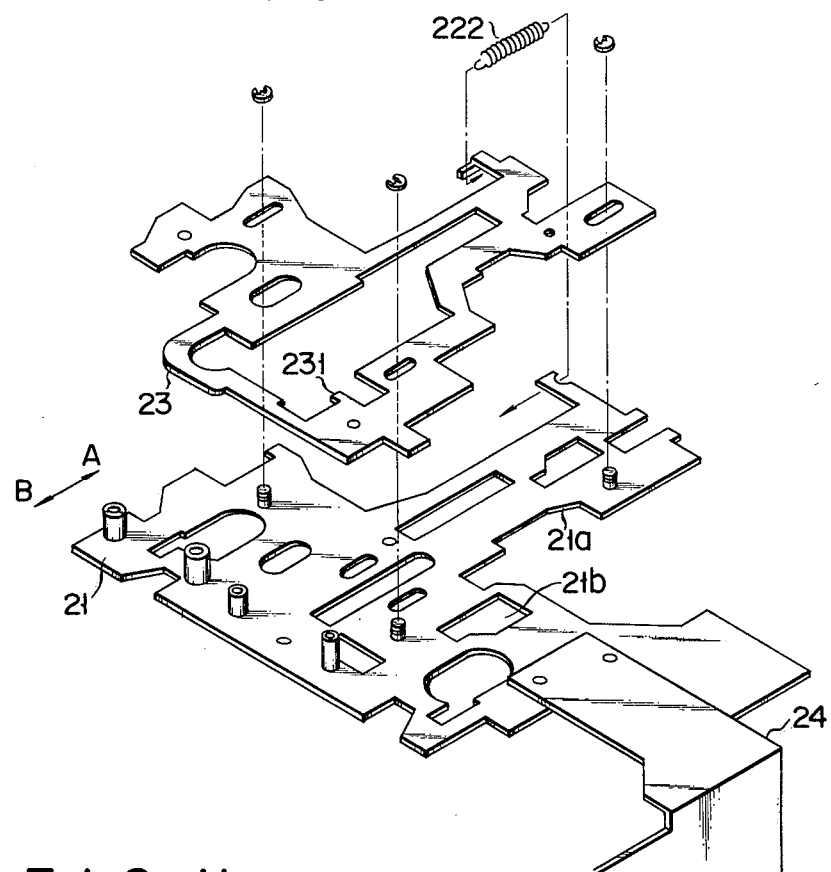
FIG. 9 is an exploded view illustrating the head chassis and a search slider.

A head chassis 21 slidably engages with the central upper portion of the main chassis 11 for cooperative movement with the PLAY operation plate 136. The switch slider 20 engages with the underside of the head chassis 21 through a spring 220 for cooperative movement with the head chassis 21 (FIG. 1). A search slider 23 engages with the upper surface of the head chassis for cooperative movement therewith (FIG. 9). In the drawings, numeral 221 denotes a spring for biasing the switch slider 20 and the head chassis in the direction B, i.e., in the interrupting direction.

FIG. 9 shows the relation between the head chassis 21 and the search slider 23. When a predetermined biasing force is exerted by a spring 222, the search slider 23 is biased toward the head chassis 21 in the direction of arrow A; it is independently slidable toward the head chassis 21 in the direction of arrow B. A specific function attained by this relation will be described later. In the drawings, numeral 24 denotes a switching lever (omitted in FIGS. 1 and 2) for opening and closing a muting switch which, protrudes from one end of the head chassis 21 and is attached to the side of the main chassis 11.

Figure 11:
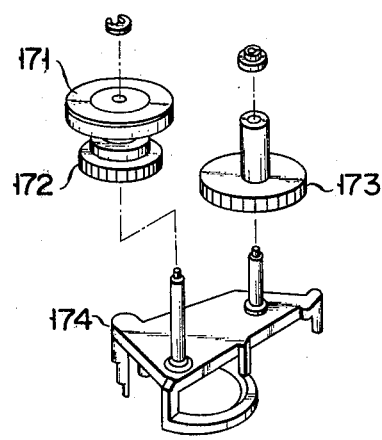
FIG. 11 is an exploded perspective view of the high speed mechanism.
Figure 10A:
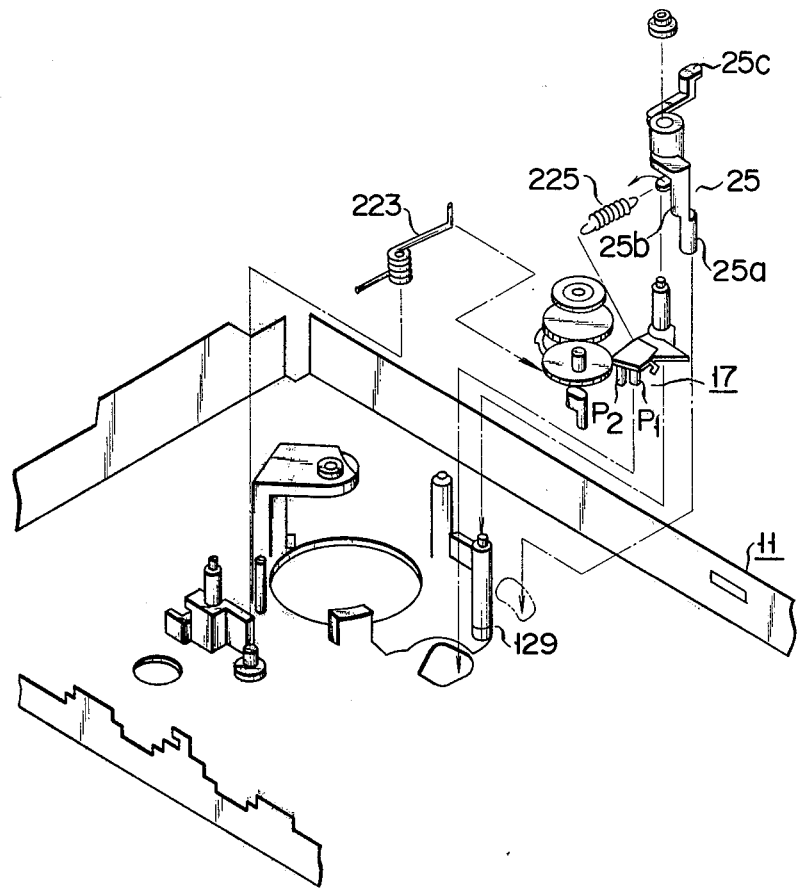
FIG. 10A is an exploded view illustrating the relation of a high speed mechanism with the main chassis.
Figure 10B:
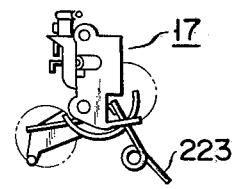
FIG. 10B is a top view of the high speed mechanism.
Figure 12A:
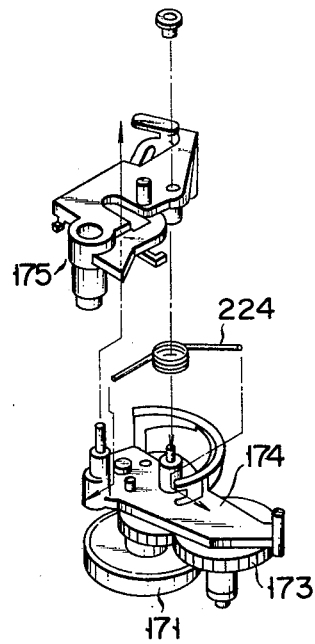
FIGS. 12A, 12B and 13 illustrate the high speed mechanism.
Figure 12B:
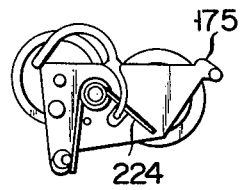

FIG. 10A shows the detail of a high speed mechanism 17. The high speed mechanism 17 pivotally engages with a plastic outserted mounting part 129 at the central lower part of the chassis 11 for cooperative movement with the REW operation plate 135 and the FF operation plate 137. The high speed mechanism 17 is biased by a predetermined force exerted by a spring 223 disposed as shown in FIG. 10B. As shown in FIG. 11, the high speed mechanism 17 comprises a high speed idler 171; an FF gear 172 coaxial therewith; an REW gear 173 to engage with the gear 172; a first high speed lever 174 on which these are rotatably mounted; and a second high speed lever 175 combined with the first high speed lever 174, as shown in FIG. 12A, by a predetermined biasing force exerted by a spring 224 disposed as shown in FIG. 12B. The high speed mechanism 17 supports an ASO control mechanism 25 with a predetermined biasing force exerted by a spring 225 as shown in FIG. 10A.

The high speed mechanism 17 of this construction operates to rewind or fast forward at high speed. When the FF operation plate 137 or the REW operation plate 135 operates, the high speed mechanism is pivoted, due to its cooperative movement with the operation plate involved, and contacts the high speed idler 171 to the flywheel 34 to be described hereinafter. The FF gear 172, in the case of FF operation, or the REW gear 173, in the case of REW operation, selectively engages the gear of a take-up reel base 262 and the gear of a supply reel base 261 (FIGS. 1 and 2).

Figure 13:
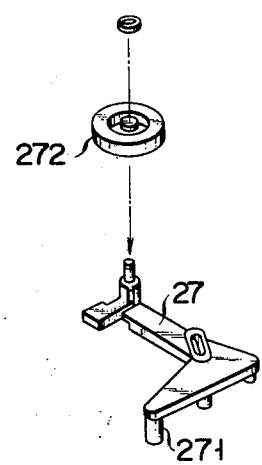

A take-up slider 27 is disposed behind the upper part of the main chassis 11 so that a pin part 271 at one of its ends engages with the common engaging part of the head chassis 21 and with the search slider 23, and the other end of the take-up slider 27 supports a take-up idler 272 at the lower part of the main chassis 11 as shown in FIG. 13. The slider 27 is L-shaped and pivotal about a pin from the chassis 11 inserted through an elongated hole at its center, and it is biased in the clockwise direction of FIG. 1. Unless the head chassis 21 is operated, the take-up slider 27 is locked in the condition shown in FIG. 1 by the pin part 271 against the biasing force of a spring 226. Thus, the take-up idler 272 and the take-up reel base 262 are unable to engage with each other. When the head chassis 21 is operated in the direction A, the pin part 271 slides along an inclined part 21a and pivot in the clockwise direction, thereby allowing the take-up idler 272 to make contact with the take-up reel base 262. Thus, the rotation of the small diameter portion of an intermediate pulley 28 is transmitted through the take-up idler 272 to the take-up reel base 262, so that the tape travels at a constant speed through the cooperation of a pinch roller 47 and the capstan 46, as will be described.

Figure 14A:
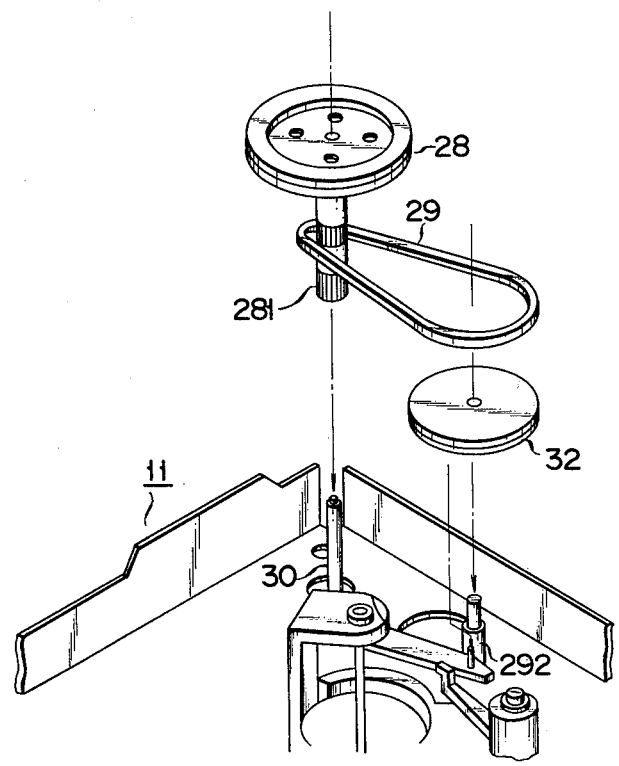
FIG. 14A is an exploded perspective view illustrating the manner in which an intermediate pulley and a cam wheel are mounted on the main chassis.
Figure 14B:
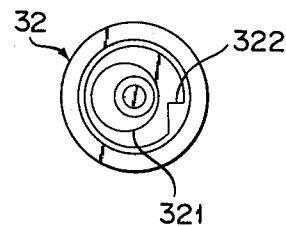
FIG. 14B is a top view of the cam wheel.

The small diameter portion of the intermediate pulley 28, as shown in FIG. 14A, is rotatably supported on an axis 30 protruding toward the lower part of the main chassis 11 from a plastic outserted mounting part 291 (FIG. 3) which is behind the upper part of the main chassis 11. The large diameter part of the pulley 28, as shown in FIG. 15A, is linked through a belt 36 to a motor pulley 33 which is connected to a motor axis. The small diameter part of the pulley 28, as shown in FIG. 14A, is linked through a belt 29 of square cross section to a cam wheel 32 constituting an automatic stopping mechanism 39 utilizing a tape stop detecting mechanism to be described hereinafter. The cam wheel 32 is rotatably supported on an outserted mounting part 292 and has an eccentric cam part 321 at its central lower part and an engaging part 322 at its periphery, as shown in FIG. 14b.

Figure 15B:
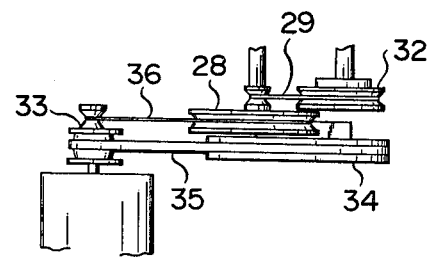
FIGS. 15A and 15B are, respectively, an exploded perspective view and a side view of a driving force transmission mechanism.
Figure 15A:
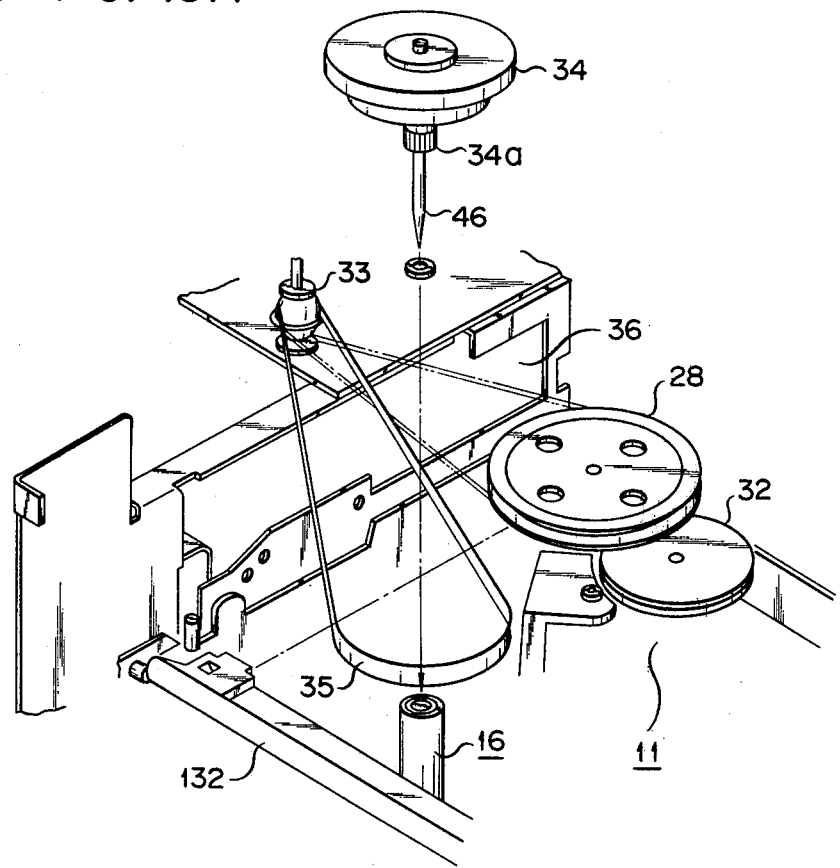

FIGS. 15A and 15B show a belt transmission mechanism from the motor pulley 33. A flat belt 35 is wound around the flywheel 34 whose shaft 46 is supported by a bearing 16, and a belt of square cross section is wound around the intermediate pulley 28. As shown in FIGS. 16A and 16B, the lower supporting portions of the flywheel 34 and the intermediate pulley 28 are rotatably supported by holding members secured to the chassis 11.

Figure 17A:
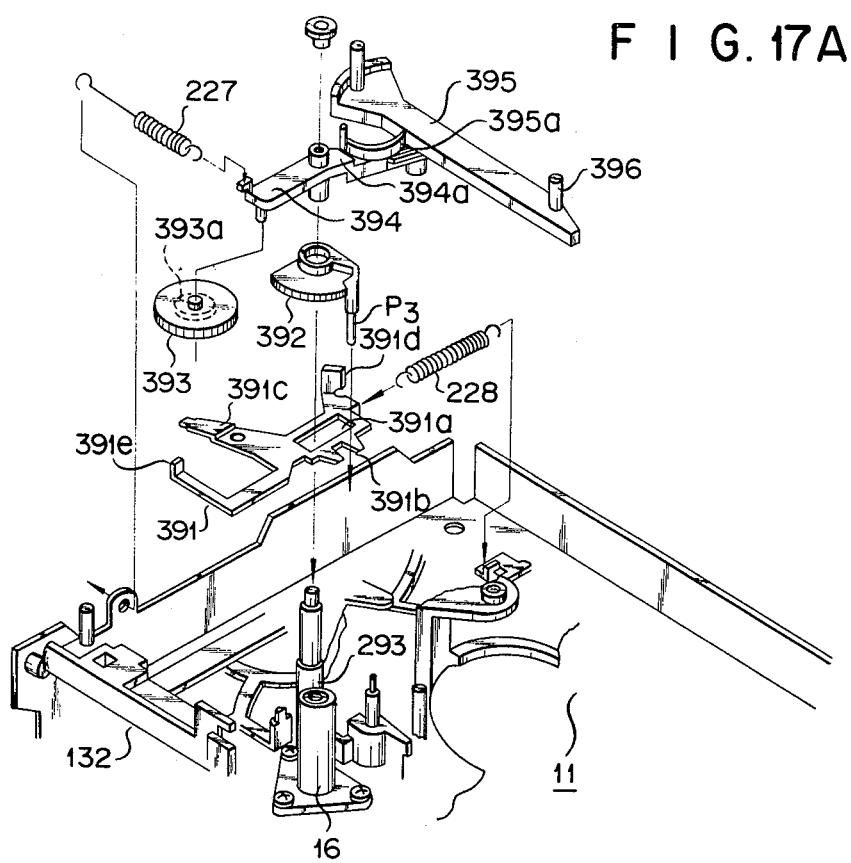
FIG. 17A is an exploded perspective view illustrating an automatic stop detection mechanism.
Figure 17B:
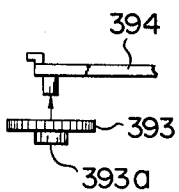
FIG. 17B is a side view illustrating an ASO lever and an ASO gear of an automatic stop detection mechanism.
Figure 18:
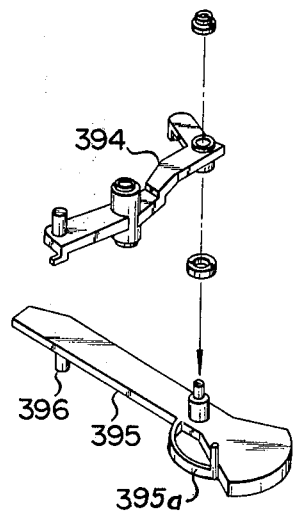
FIG. 18 is an exploded perspective view of the ASO lever and the ASO detection lever of the automatic stop detection mechanism.

The automatic stopping mechanism 39 utilizes a tape stop detecting mechanism which includes the cam wheel 32. This automatic stopping mechanism 39, as shown in FIGS. 17A, 17B and FIG. 18, has an ASO slider 391, an ASO gear 392, another ASO gear 393, an ASO lever 394, and an ASO detection lever 395 which engage with a plastic outserted mounting part 293 positioned at the lower part of the main chassis 11. The ASO lever 394 is biased in the counterclockwise direction of FIG. 2 by a spring 227, and the ASO slider 391 is biased backward by a spring 228 (FIG. 17A).

A pin 396 at the end of the ASO detection lever 395, as shown in FIG. 2, slidably contacts the eccentric cam part 321 of the cam wheel 32. The central side of the lever 395 linearly engages with a chord 262b of a friction mechanism 262a which is coaxial with the take-up reel base 262 and which is biased in the direction of rotation of the reel base 262. Thus, the ASO detection lever 395 is biased in the clockwise direction of FIG. 2 as long as the take-up reel base 262 is rotating, regardless of its direction of rotation. By its pin 396, the lever 395 thus follows the cam part 321 of the cam wheel 32 for oscillatory movement. In this case, the cam wheel 32 is rotating in cooperation with the intermediate pulley 28 independently of the direction of rotation of the reel base, that is, the direction of tape travel. When the take-up reel base 262 stops due to the end of the tape (or entangling of the tape), the rotation of the friction mechanism 262a stops, the clockwise biasing force exerted to the ASO detection lever 395 disappears, and the pin 396 is returned to its maximum eccentric position with respect to the cam part 321 of the cam wheel 32.

The ASO detection lever 395, capable of oscillatory movement, is attached to one end of the ASO lever 394. A cam releasing member 395a of elastic material protrudes in an arc from the attached part of the lever 395 and is formed integrally with the part by any suitable method, such as molding. The pointed end of the cam releasing member 395a detachably engages with a step part 394a of the ASO lever 394. The ASO lever 394 has an intermediate projection which is supported by the mounting part 293 and coaxial with the sector form ASO gear 392, which is pivotal about this projection. This central projection is inserted in an elongated hole 391a of the ASO slider 391. The ASO gear 393 is rotatably supported by a pointed end of the lever 394. A small gear part 393a engaging with the ASO gear 392 is coaxially secured to the ASO gear 393. In this case, the ASO slider 391 is longitudinally slidable and is pivotal about the above-mentioned intermediate projection. A pin $P_3$ of the ASO gear 392 engages with an engaging recess 391b. An extension 391d of the ASO slider 391 detachably engages with the tip end of the pin part of the elastic cam releasing member 395a of the ASO detecting lever 395. A pointed end 391e of the ALO slider 391 normally opposes a lock releasing part 132a of the lock plate 132 (FIG. 2). The ASO gear 393 detachably engages with a small gear part 34a (FIG. 15A) of the flywheel 34 received by the bearing 16.

Figure 19:
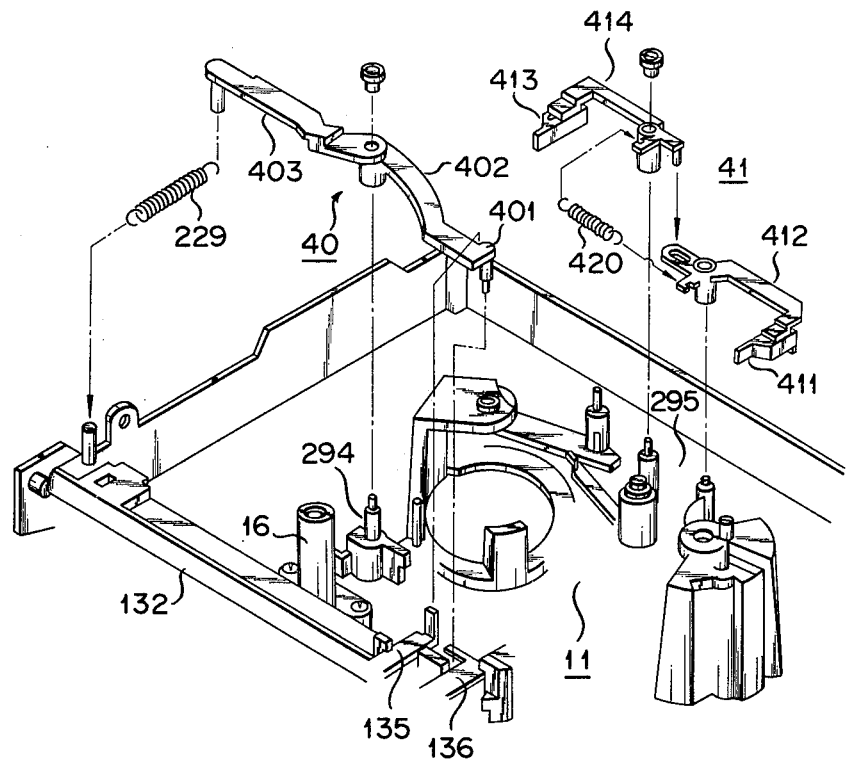
FIG. 19 is an exploded perspective view of a second program control mechnanism.

The pointed end of a program control mechanism 40, shown in FIG. 19, detachably engages with a projection 391c (FIG. 2) of the ASO slider 391 of this automatic stopping mechanism 39. The program control mechanism 40 comprises an operating lever 402, another operating lever 403, and a spring 229. One end 401 of the operating lever 402 is free only when both PLAY operation plate 136 and the REW operation plate 135 are pressed, and is locked and prevented from rotating under other operating conditions. One end of the operating lever 403, which is formed of synthetic resin and practically integral with the operating lever 402, engages with the other end of the operating lever 402, and is received by a plastic outserted mounting part 294 at the lower part of the main chassis 11. The spring 229 exerts a biasing force on the other end of the operating lever 403 toward the projection 319c (FIGS. 2 and 17) of the ASO slider 391. If the operating lever 403 rotates under the biasing force of the spring 229 when the operating lever 402 is free, that is, when both the operation plates 135 and 136 are pressed, the pointed end 391e of the ASO slider 391 opposes a lock engaging part 132b of the locking plate 132.

Referring to FIG. 19, a brake mechanism 41 engages a plastic outserted mounting part 295 at the lower part of the main chassis 11. This brake mechanism 41 comprises a supply side brake lever 412 and a take-up side brake lever 414. (In FIG. 2, the respective shoe parts 411 and 413 are omitted.) The supply side brake lever 412 operates in cooperation with the switch slider 18 (FIG. 2) so that its pointed end shoe 411 detachably engages with the gear part of the supply side reel base 261. The take-up side brake lever 414 is biased by the supply side brake lever 412 and by a spring 420 with a predetermined force, so that its pointed end shoe part 413 detachably engages with the gear of the take-up reel base 262.

The shoe parts 411 and 413 engage shallowly with the gear parts of the reel bases 261 and 262, as opposed to deep engagement wherein they engage with each other substantially at right angles. In a conventional brake mechanism, the brake shoes have a certain direction ratio so that the supply side engages deeply and the take-up side engages shallowly. However, both the supply side and the take-up side engage shallowly in this case to prevent excessive tension on the tape. Excessive tension may be caused because control of the direction ratio is difficult when small inertias are involved, as in the case of the reel bases of a cassette tape recorder. That is, the brake mechanism is constructed so that undesirable tape slippage is practically eliminated by constantly exerting a slight braking torque on the reel base.

Referring to FIG. 1, the program control mechanism 43 includes a notched gear 431 which detachably engages with a pointed end gear 281 (FIG. 14A) disposed at the small diameter portion of the intermediate pulley 28 and protruding upwards from the lower portion of the main chassis 11. A program lever 435 rotatably engages a pin 433 mounted on a cooperating gear 432 engaged with a small gear 431a coaxial with the notched gear 431 at a gear ratio of 1:2, with a cam groove 434 at one end of the notched gear 431. A bias lever 436 is coaxially received by the program lever 435, and a tension spring 421 is disposed between the program lever and the bias lever. The gear 431 and 432, and the levers 435 and 436 are, respectively, attached to plastic outserted mountings 296 and 297 shown in FIG. 3.

Figure 20:
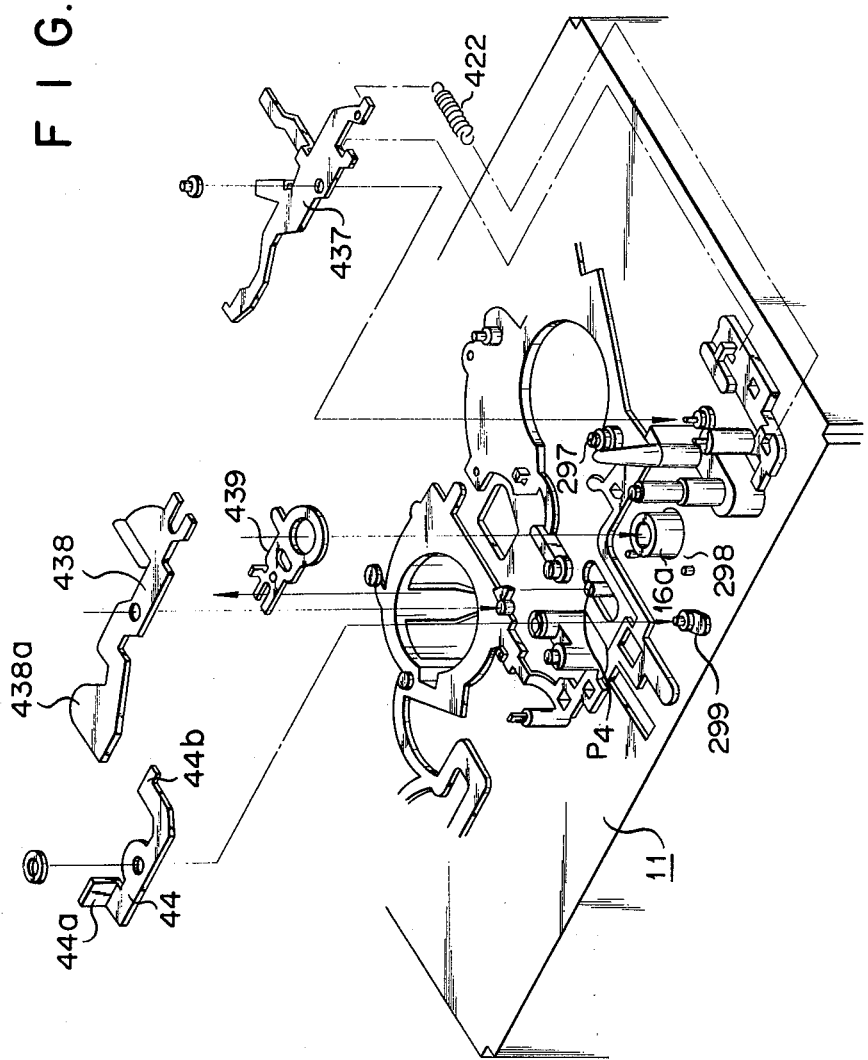
FIG. 20 is an exploded perspective view of a first program control mechanism.

A first program control mechanism 43 comprises a gear lock lever 437, a high speed system cutting lever 438 and a cue lever 439, while engaging with the cooperative gear 432 and the levers 435 and 436. Each of these members of the program control mechanism engages with a plastic outserted mounting part 298 (except for the cue lever 439, which engages with the projection 16a of the bearing 16) at the upper part of the main chassis 11 as shown in FIG. 20. In this case, as shown in FIG. 1, the high speed system cutting lever 438 engages with a pin part 435a at the other end of the program lever 435 which detachably engages with the head chassis 21. It also detachably engages with two pins $P_1$ and $P_2$ (FIG. 10A) of the high speed mechanism 17 which protrude upwards from the lower part of the main chassis 11. The gear lock lever 437 has a clockwise bias from a tension spring 422, that is, in the direction which locks the cooperative gear 432 with a first extension 437a of the gear lock lever 437. The gear lock lever 437 is also made engageable by a second extension spring 437b with a pin $P_3$ (FIG. 17A) of the ASO gear 392 of the automatic stopping mechanism 39 which utilizes the tape stop detection mechanism protruding upwards from the lower part of the main chassis 11. A third extension 437c engages with an extension 439a of the cue lever 439 which normally keeps it in place against the biasing force exerted by the spring 422.

The cue lever 439 engages with a pin $P_4$ (FIG. 8) of the switch slider 18, this slider protruding upward from the lower part of the main chassis 11. Its tongue detachably engages with an extension 436B of the bias lever 436. The extension 436a of the bias lever 436 detachably engages with another extension of the gear lock lever 437. The extension 436b detachably engages with the other end of the program lever 435 and with the notch 21b of the head chassis 21.

As a result, when the head chassis 21 is in the position shown in FIG. 1, the extension 436b of the bias lever 436 engages with the notch 21b of the head chassis 21, and its engagement with the program lever 435 is released. When the head chassis 21 is withdrawn by pressing the PLAY operation plate 136, the extension 436b disengages from the notch 21b and engages with the program lever.

Referring to FIG. 20, a pause control lever 44 pivotally engages with a plastic outserted mounting part 299 at the upper part of the main chassis 11. One end 44a of this lever 44 protrudes from the notch of the switch slider 18 and the head chassis 21, and engages with an engaging piece 231 of the search slider 23. The other end 44b of this lever 44 detachably engages with an extension 138a of the pause operation plate 138 protruding from the lower to the upper part of the main chassis 11 (FIG. 1).

As a result, as the PLAY operation plate 136 is pressed so as to move the head chassis 21 and the search slider 23 backward, the engaging piece 231 of the search slider 23 presses one end 44a of the pause control lever 44 to pivot it clockwise. When the pause operation plate 138 is pressed under these conditions, the other end 44b of the pause control lever 44 is pressed to pivot counterclockwise, and the end 44a presses the engaging piece 231 of the search slider 23 forward. Then, the search slider 23 alone is returned as the head chassis 21 is kept in this position.

Referring to FIG. 20, an erroneous recording prevention lever control 438a, omitted in FIG. 1, is integrally formed with the pointed end of the high speed system cutting lever 438 so as to engage with a pin $P_5$ of the erroneous recording prevention lever 438 (FIG. 1).

In FIG. 1, numeral 45 denotes a pinch roller which is pivotal in the direction of the capstan 46 and is coaxially integral with the flywheel 34 against the biasing force when the search slider 23 slides in the direction A. However, a recording and reproducing head and an erasing head mounted on the head chassis 21 are omitted in the figure.

The REC operation plate 134 shown in FIG. 2 is controlled by an erroneous erasure prevention lever (not shown), similar to conventional ones (for detection of cassette pawls), mounted on the plastic outserted erroneous erasure prevention lever mounting part 123 shown in FIG. 3. When the erroneous recording prevention lever 14 is biased in the counterclockwise direction by the spring 153, it is controlled by a pin $P_5$ of the lever 14 (FIG. 1) engaged with one end of the head chassis 21 as the pin protrudes from the lower to the upper part of the main chassis 11. The operation of this lever 14 is also controlled by detachably engaging a pin $P_6$ at the lower part of the main chassis 11 with the notch 134a of the REC operation plate 134. When the PLAY operation plate 136 is operated, the erroneous recording prevention lever 14 disables the operation of the REC operation plate 134 to prevent any erroneous recording. Recording is possible when the REC operation plate 134 and the PLAY operation plate 136 are simultaneously operated for the purpose of recording.

It is obvious that a recording reproduction switch (not shown) is set at the recording side when the REC operation plate 134 is operated.

After the REC operation, the REC operation plate 134 is locked at two stages by the locking function of the locking plate 132 and by the engagement of the pin $P_6$ of the erroneous recording prevention lever 14 with its engaging part 134b. This is to prevent undesirable noises from being recorded since the REC operation plate 134 is released before the head chassis 21 is returned, which may occur if only the locking plate 132 is used for interrupting the recording by operating the STOP operation plate 133 when the REC operation plate 134 and the PLAY operation plate 136 are in operation for recording. That is, the releasing of the erroneous recording prevention lever 14 by the pin $P_6$ is normally performed in cooperation with the return of the head chassis 21 by pivoting the pin $P_5$ of the lever in the counterclockwise direction so as to delay the return of the REC operation plate 134 (FIG. 1).

The operation of a tape recorder of this construction will now be described. Since each independent operation of conventional tape recorders, that is, reproduction, recording, fast forwarding, rewinding, pause, and stop, is obvious from the above description concerning the construction of each part and from the following description of the operation of each part, description will be made only for necessary items.

A tape recorder of this construction is capable of performing an automatic repeating function in addition to a program reproduction function such as music selection. The operation of the automatic stop mechanism 39 using a tape stop detection mechanism utilized in these multiple functions will first be explained.

If the tape recorder of this construction is in the operation of recording, rewinding, reproduction, or fast forwarding when one of the REC, REW, PLAY or FF operation plates 134 to 137 is locked in its operative position, the take-up reel base 262 is rotated in the forward or reverse direction, at a high speed or at a constant tape speed. The ASO detection lever 395 of the automatic stop mechanism 39 using the tape stop detection mechanism is biased in one direction by the chord 262b of the friction mechanism 262a so as to oscillate following the cam part 321 of the cam wheel 32. When the tape comes to an end under these conditions, the biasing force disappears and the ASO detection lever 395 is returned to the position of the maximum eccentric part of the cam part 321.

Upon another rotation of the cam wheel 32, the pin 396 of the ASO detection lever 395 engages with the engaging part 322 of the cam wheel 32. The ASO lever 395 is pivoted in the clockwise direction against the biasing force exerted by the spring 227 in cooperation with the movement of the ASO detection lever 395 in the direction of the arrow. The pointed end of the ASO lever 394 engages for rotation with the small gear part 34a of the flywheel 34 (this rotates independently of tape travel). The small gear 393 of the ASO gear pivots the sector form ASO gear 392 in the counterclockwise direction, and its pin $P_3$ displaces the ASO slider 391 in the direction of the arrow B. Then, the pointed end 391e of the ASO slider 391 presses the lock releasing part 132a of the locking plate 132 so as to upwardly pivot the locking plate 132 in a direction perpendicular to the plane of the paper, thereby releasing one of the operation plates to stop the tape recorder. This automatic stop function is called "mechanically fully automatic shut off".

When the ASO slider 391 is displaced downwardly, since the elastic piece 395a of the ASO detection lever 395 is already in engagement with the extension 391d of the slider 391 due to the displacement of the ASO detection lever 395 in the direction of the arrow, the elastic piece 395a is pressed by the extension 391d thereby pivoting the ASO detection lever 395 in the clockwise direction. The pin 396 of the ASO detection lever 395 is disengaged from the engaging part 322 of the cam wheel 32. The ASO detection lever is returned to its original position, and the automatic stop mechanism 39 as a whole is returned to its original position.

This cam releasing function prepares the automatic stop mechanism 39 for the next operation and contributes to the prevention of excessive driving force or eccentricity exerted on the mechanism which may cause troubles or irregular operation. This construction is simple in that the elastic piece 395a is made to protrude from the ASO detection lever 395. However, it is extremely advantageous in that the automatic stop mechanism 39 can not only perform its automatic stop function by releasing the lock of the operation plates, it can also perform a cam releasing function.

The tape recorder contemplated in this embodiment has a built-in radio receiver. If the power source of the motor of the tape recorder is of a different system, the cam wheel 32 can be rotated independently of the operations of the REW, PLAY or FF operation plates. In this case, since the take-up reel base 262 is stationary, undesirable circumstances may occur such as repeated operations of the automatic stop mechanism 39. The ASO control mechanism 25 is intended to prevent this kind of erroneous operation. This is accomplished by biasing the ASO detection lever 395 by one end 25c of the mechanism 25, always in the clockwise direction of FIG. 2, so as to prevent the engagement of the pin 396 with the engaging part 322 of the cam wheel 32. Thus, the automatic stop mechanism 39 will not operate when none of the REW, PLAY and FF operation plates are in operation. When the PLAY operation plate 136 is operated, the notched inclined part 21c of the head chassis 21 pivots the protruding pin 25a (protruding from the lower side to the upper side of the main chassis 11) of the ASO control mechanism 25 in the clockwise direction of FIG. 1. When the REW operation plate 135 or the FF operation plate 137 is in operation, the inclined part 18b of the switch slider 18 pivots the base 25b of the pin 25a in the clockwise direction, and one end 25c of the mechanism 25 releases the biasing force exerted on the ASO detection lever 395. The automatic stop mechanism 39 normally operates in the above-mentioned manner (FIG. 10A).

The automatic stop function, that is, "the mechanical fully automatic shut off" incorporated by the automatic stop mechanism 39, stops the tape recording mechanism at the tape end regardless of its operation mode, in the operation of conventional tape recorders. However, this operation is unnecessary when a composite function is to be performed by combining a plurality of operation plates, such as the automatic repeat function and the program reproduction function. For example, for performing the automatic repeat function, the REW and PLAY operation plates are operated in combination; after a reproduction, automatic rewinding is performed to enable repeated reproductions. Thus, if the automatic stop function is performed by releasing the locking plate at the tape end of a first reproduction or that of a first rewinding, repeated reproduction is not possible. The same is true in the case wherein the program reproduction, such as music selection, is performed by combining the REW and PLAY operation plates.

Thus, a second program control mechanism 40 is required to enable the automatic stop mechanism 39 to selectively release the locking plate. The operating lever 402 is pivoted in the clockwise direction of FIG. 2 by the biasing force of the spring 229 when both the PLAY operation plate 136 and the REW operation plate 135 are operated. The operation lever 402 presses, through the operation lever 403, one end 391c of the ASO slider 391 in the clockwise direction, and pivots the pointed end 391e of the slider 391 so that it opposes the lock engaging part 132b of the locking plate 132. Since the lock engaging part 132b is recessed, unlike the lock releasing part 132a which is protruding, the pointed end 391e only enters the recessed lock engaging part 132b without pivoting the locking plate 132 when the automatic stop mechanism 39 detects a tape end, and finally it downwardly displaces the pointed end 391e of the ASO slider 391.

It is also possible to perform a program reproduction, such as music selection by combining the FF and PLAY operation plates. However, when the tape comes to an end in this case, since no further driving operation is possible, a releasing operation is performed without disabling the release of the automatic stop mechanism 39, thereby stopping the tape recorder mechanism.

In the case of program reproduction, by combining the REW and PLAY operation plates, the releasing operation of the locking plate by the automatic stop mechanism 39 is not performed. Since the REW operation plate is already in operation, it is made to rewind without stopping to be prepared for another music selection operation.

Thus, selective operation of the automatic stop mechanism 39 by the program control mechanism 40 is made possible. In this case, the ASO slider organically controls the above functions, the ASO slider being coaxial with the support shaft of the ASO lever 394 which supports the ASO detection lever 395 of the automatic stop mechanism 39. The multifunctional tape recorder of this invention is simple in construction and inexpensive to manufacture in that the automatic stop mechanism 39 comprising the releasing gear 392 and 393 on the ASO lever 394 for simultaneously accomplishing the automatic stop function and the cam releasing function and the ASO slider 291 are utilized for performing the automatic repeating function and the program reproducing function.

The automatic repeat function will now be described. For performing this function, the PLAY operation plate 136 and the REW operation plate 135 must be operated simultaneously. Then, the head chassis 21 and the REW gear 173 of the high speed driving mechanism 17 are both operated. However, the presence of the program lever 435 interferes with the operation of one of these mechanisms, while the other is free to operate for reproduction or rewinding.

Figure 23A:
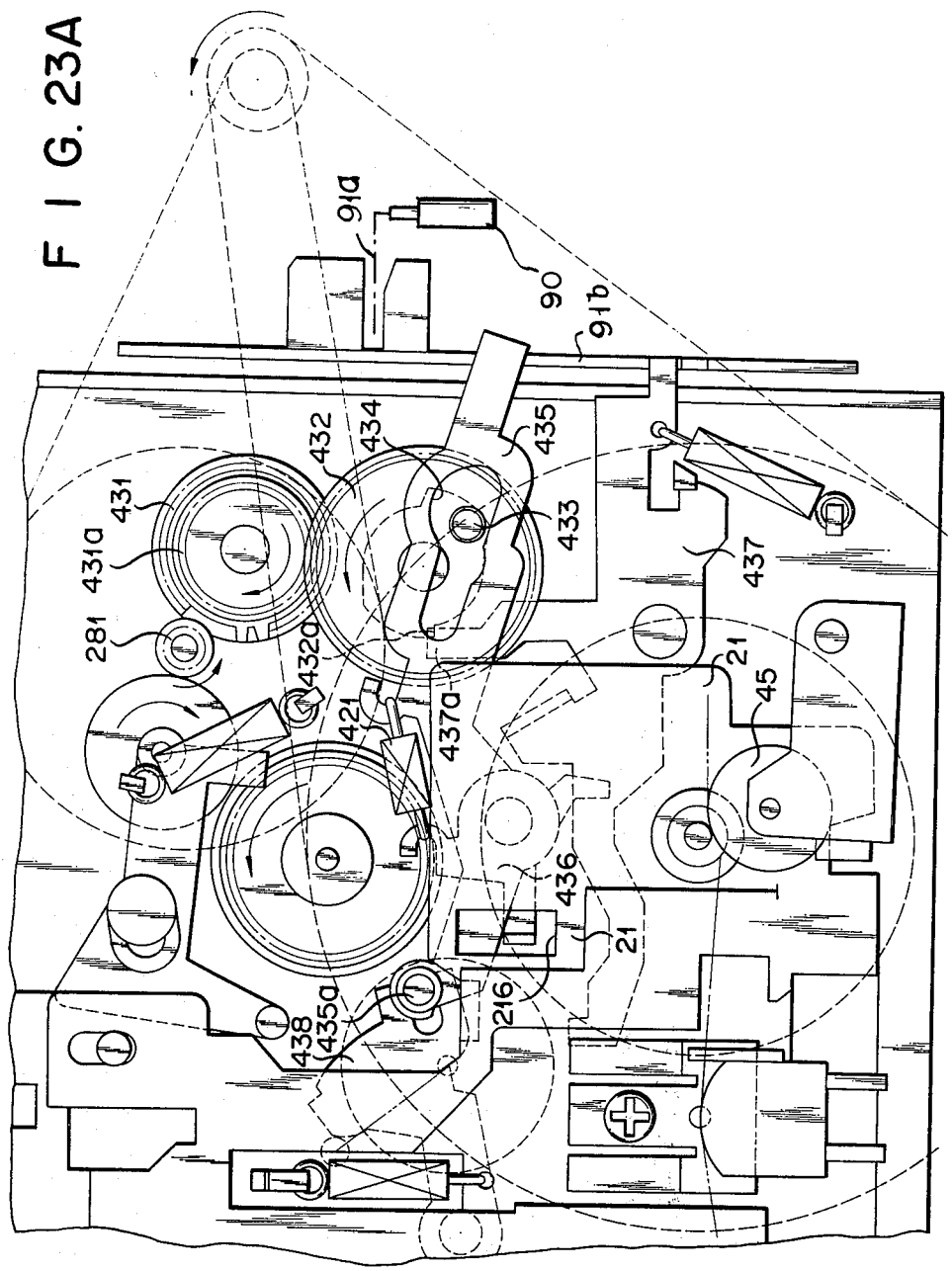

Assume that the tape recorder is in the reproducing condition (The operation mode in this case is determined by which of the operation plates 136 and 135 is operated first. It is possible to set a priority for the tape recorder of the reproduction and rewinding operations when both of them are operated simultaneously.) The cue lever 439 cooperative with the switch slider 18 is pivoted in the clockwise direction so as to pivot the gear lock lever 437 in the same direction. The first extension 437a of the gear lock lever 437 engages a cam 432a disposed at the lower part of the cooperative gear 432 so as to lock the cooperative gear 432. The tongue of the cue lever 439 engages with the first extension 436a of the bias lever 436 to bias it in the counterclockwise direction. Since the second extension 436b is free due to the entry of head chassis 21, the bias lever 436 pivots in the counterclockwise direction so as to bias the program lever 435, by a spring 421 for pivoting in the same direction. In the reproducing operation described above, the program lever 435 itself is in the position pivoted in the clockwise direction from the position shown in FIG. 1 so that its left end is raised and its right end is lowered, and the high speed cutting lever 438 engaging with the pointed end pin 435a of the lever 435 is pivoted in the counterclockwise direction. Since the pin $P_2$ of the high speed mechanism 17 is pivoted in the counterclockwise direction, the REW gear 173 is disengaged from the gear of the supply side reel base 261 (FIG. 23A).

When the tape comes to the end in the automatic repeat operation mode, the pin $P_3$ of the automatic stop mechanism 39 engages with the corresponding extension 437b of the gear lock lever 437 so as to pivot it in the counterclockwise direction. The cooperative gear 432 is thus made rotatable from its locked position by the first extension 437a. (As was described hereinbefore, the automatic stop mechanism 39 does not release the lock of the operation plates.)

Figure 23B:
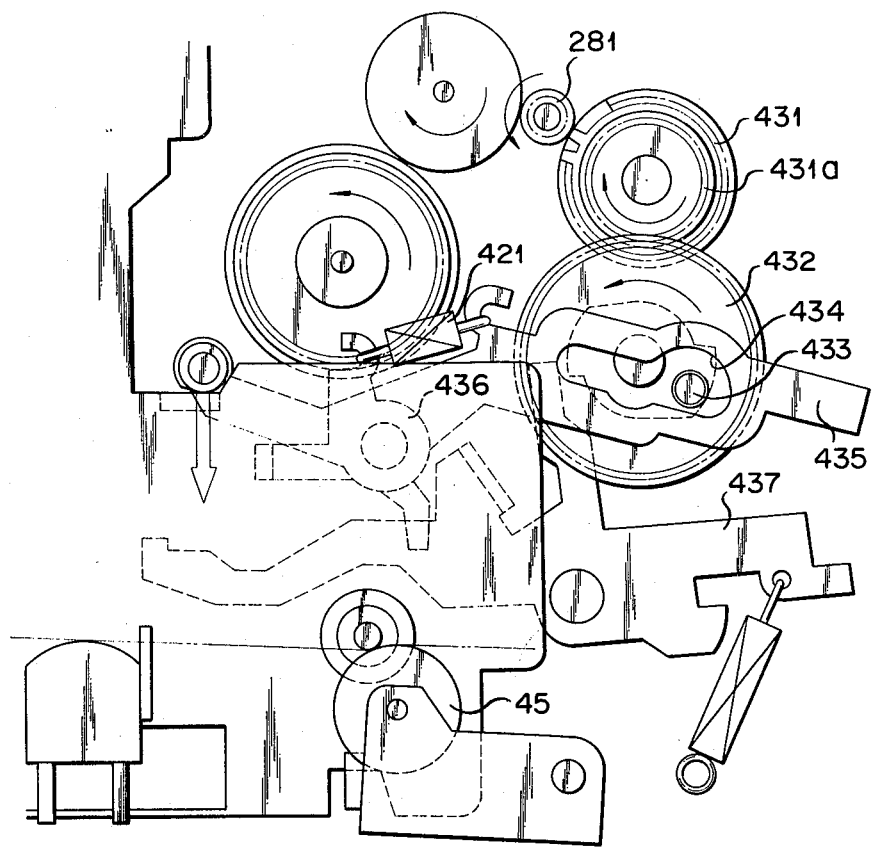

Under this condition, the program lever 435 is biased in the counterclockwise direction by the spring 421 through the bias lever 436 so that the lever 435 and the cooperative gear 432 are slightly pivoted in the counterclockwise direction by the pin 433 and the cam groove 434. As the notched gear 431 engaging with the cooperative gear 432 is slightly pivoted in the clockwise direction, the notched gear 431 engages with the gear part 281 of the intermediate pulley 28 which has been disengaged from the notch of the notched gear 431 and which is rotating independently of the tape travel (FIG. 23B). As a result, by the rotation of the intermediate pulley 28, the notch gear 431 and the cooperative gear 432 are rotated. The program lever 435 whose notched cam groove 434 is engaging with the pin 433 of the cooperative gear 432 is pivoted in the counterclockwise direction to a horizontal position, shown in FIG. 1 and FIG. 23c, from its clockwise pivoted position wherein its left end is raised and its right end is lowered.

When the program lever 435 is pivoted in the counterclockwise direction, the pin 435a withdraws the head chassis 21 to its waiting position so as to pivot the high speed cutting lever 438 in the clockwise direction and to pivot the pin $P_2$ of the high speed driving mechanism 17 in the same direction. Then the REW gear 173 is from its waiting position to an operative rewinding condition to engage with the gear part of the supply reel base 261.

When the tape comes to the end during the automatic repeat operation, the cooperative gear 432 locked by the gear lock lever 437 (this lever is released from its locked condition at the end of the reproducing condition and is again locked as a series of switching operations from the reproducing condition to the rewinding condtition is completed) is released by the pin $P_3$ of the automatic stop mechanism 39. The program lever 435 is biased in the clockwise direction by the head chassis 21 so as to engage the notched gear 431 with the gear part 281 of the intermediate pulley 28. As was described hereinbefore, the program lever 435 is first pivoted counterclockwise by the rotational force of the intermediate pulley 28 to the horizontal position shown in the figure, and then it takes a clockwise pivoted position wherein its left end is raised and its right end is lowered. Therefore, the head chassis 21 is allowed to enter and the REW gear 173 is withdrawn by the high speed system cutting lever 438, thus to the reproducing operation mode.

Thus, the automatic repeat operation of reproduction→rewinding→reproduction→rewinding . . . is performed.

This automatic repeat operation can be interrupted by the STOP operation plate 133. When the head chassis 21 is returned, its notched part 21b pivots the extension 436b of the bias lever 436 in the clockwise direction so as to pivot the program lever 435, and thus, the cooperative gear 432 through the spring 421, in the counterclockwise direction. The notched gear 431 is returned to its normal position (FIG. 1) wherein it is disengaged from the gear part 281 of the intermediate pulley 28, thereby enabling the next desired operation to be performed.

In a mechanism for facilitating this automatic repeat operation, the program lever 435 for directly switching between the reproducing and rewinding modes is in the reproducing mode biased by the head chassis 21 and in the rewinding mode it is biased by the bias lever 436 and the spring 421 that are separate biasing members for the REW driving system. The high speed system cutting lever 438 in cooperation with the program lever 435 cuts the REW driving system. Since the gear lock lever 437 is released by the pin $P_3$ of the automatic stop mechanism 39, multi-functional operations can be efficiently performed by utilizing the automatic stop mechanism 17.

Next, the music selection function as a program reproducing function will be described with particular reference to its basis principles. FIG. 21 shows a diagram of the electrical system of a tape recorder with a music selection function (more generally, multi-data selective reproduction). Position setting information for selected music from the present tape position is set in advance in a setting circuit 81 designating before or after 1, 3, 5, 7 . . . songs. This position setting information is fed to a comparator circuit 82 which supplies the information to a control circuit 84 only when the discriminating signal is "1". The discriminating signal is "0" in the reproducing mode and it is "1" in the rewinding mode. A music blank detector part 85 (more generally a data blank detecting part) detects the blanks (this may be special position information) between the songs recorded on the tape when the tape is fast forwarded or rewound. Each detection signal is counted by a counter circuit 86 and its counter output is fed to the control circuit 84, thereby correlating the counter output with the position setting information in agreement. When there is a correlated output, a shaped signal from a pulse shaping circuit 87 is supplied as a control pulse to a plunger, shown at 90 in FIG. 23A, of a tape recorder mechanism 83. Thus, the tape recorder mechanism 83 is switched from the high speed fast forwarding or rewinding mode to the constant speed reproducing mode through an electrical-mechanical converting mechanism such as this plunger.

When the correlation signal disappears, the tape recorder mechanism 83 is again placed under high speed fast forwarding or rewinding mode through a mechanism such as said plunger. Thus, every time a correlation signal is obtained, the tape recorder mechanism switches from its high speed fast forwarding or rewinding mode to the constant speed mode, thereby performing the song selection function as a program reproducing function.

A skip circuit 88 in FIG. 21 is capable of switching from the high speed fast forwarding or rewinding mode to the constant speed reproducing mode and vice versa when a skip switch 881 is in operation. A pulse shaping circuit 882 feeds it a control pulse as a skip signal. Even in the middle of reproduction, the skip circuit can perform a skip function to advance the tape to the next set song.

The tape recorder mechanism as described above, which is controlled by an electrical system, is capable of performing the music selection function in addition to the automatic repeat operation. This is done by releasing the lock of the gear lock lever 437, not by the pin $P_3$ of the automatic stop mechanism 39 as a tape stop detection mechanism, but by plunger 90 described above which is biased or not biased when there is a correlation signal as described above through a mechanical linkage 91a and gear lock lever pusher arm 91b.

Thus, when the reproduction of a song (program) prior to the present position of the tape is desired, the PLAY operation plate 136 and the REW operation plate 135 are simultaneously operated as in the automatic repeat operation.

When the reproduction of a song (program) in an advanced position from the present position of the tape is desired, the PLAY operation plate 136 and the FF operation plate 137 are simultaneously operated. In this case, the description of the automatic repeat operation applies if rewinding is replaced by fast forwarding; the pin $P_2$ of the high speed driving mechanism 17 by $P_1$; the REW gear 173 by the gear 172; and the supply side reel base 261 by the take-up side reel base 262.

When the tape comes to the end in performing the music selection function in both directions, it is rewound if the selection is in the reverse direction (combination of PLAY and REW) and it is stopped if the selection is in the forward direction (combination of PLAY and FF).

One of the advantageous features of such a mechanism capable of performing the music selection function as a program reproducing function is that when the PLAY operation plate 136 and FF operation plate 137 are simultaneously locked in operating positions especially in making selections in the forward direction, switching between the reproducing and fast forwarding modes can be internally made without releasing each operation plate. If the operation plates need to be released, other operation plates must be operated. In this case the construction becomes complex and the functions may not be covenient. Thus, if a separate mechanism is internally included for separately switching the cooperating mechanisms without releasing the operation plates, the construction may be made simple and the multi-functional feature may be advantageously utilized.

For performing the program reproducing function in the forward or reverse direction, the gear lock lever 437 is controlled through the switch slider 18 and the cue lever 439 cooperating with the FF operation plate 137 and the REW operation plate 135, and cutting of the high speed driving mechanism 17 of the FF driving system or the REW driving system is performed by a member such as the high speed system cutting lever 438. An organic construction suitable for multi-functional purpose is thus obtained.

Although the description has been made with respect to the music selection function, it is to be understood that the selection of one particular song is also possible.

Next, considerations given for preventing errors in performing the music selection as a program reproducing function will be described. In a music selection mechanism, a blank between the recorded portions of the tape (a part of without signals) is searched in either the high speed rewinding or fast forwarding mode and then the mode is switched to the constant speed reproducing mode. The switching time must be extremely short. The high speed travel of the tape is 30 times as fast as that of the reproducing speed. A typical blank between the songs is about 5 seconds at the constant reproducing speed. The head thus passes the blank at the speed of $5/30 = 167$ msec. For electrically detecting such a blank, it is necessary to set the mechanism to recognize a blank when a section with no signals spans more than about 100 msec. (This is necessary since a section without signals during a song should not be recognized as a blank between songs.) Thus, the switching time is $167 - 100 = 67$ msec at maximum. In practice, however, it is necessary to set the switching time at around 30 msec, considering variations in the electrical time constant and fluctuating factors in the selection mechanism itself. When this is not satisfied, correct music selection may not be performed, resulting in errors in operation.

In order to satisfy this requirement, switching between fast forwarding or rewinding is performed by the program lever 435. The magnitude of an over stroke of the program lever 435 is made small in switching from rewinding or fast forwarding to reproduction and it is made great in switching from reproduction to rewinding or fast forwarding. Thus, even though the period of one cycle of the program lever 435 in either direction may be constant, the switching time from rewinding or fast forwarding to reproduction may be set to satisfy the above 30 msec requirement.

In this case, the program lever 435 is driven for freely switching between the reproducing position wherein its left end is raised and its right end is lowered and the rewinding or fast forwarding position wherein it is substantially horizontal (strictly speaking, its left end is lowered and its right end is raised) by a cam groove 434 engaging with the pin 433 of the cooperative gear 432. In order to effectively transmit the biasing force for switching from one operating mode to another, an over stroke is taken.

FIG. 22 diagramatically shows the over stroke of the program lever 435 as described above. In switching from reproduction to rewinding or fast forwarding, the pointed end of the program lever 435 moves from its reproduction holding position (E) to the (F) position wherein an actual switching is performed. It further advances to the (G) position and stops. The space between (F) and (G) is an over stroke $L_1$. In switching from rewinding or fast forwarding to reproduction, the pointed end of the program lever 435 moves from the rewinding or fast forwarding holding position (G) to the (H) position wherein an actual switching is performed. It then advances to the (E) position and stops. The space between the (H) and the (E) positions is an over stroke $L_2$. The above description applies to the case wherein $L_1 > L_2$.

The time required for one cycle of the program lever 435 can not exceed a certain value due to the requirements imposed by the driving force for switching.

Additional functions, such as reviewing and cueing will now be described. In the reviewing operation, while selectively operating the REW operation plate 135 and the FF operation plate 137 in reproduction by operating the PLAY operation plate 136 alone, the tape is rewound or fast forwarded to repeatedly reproduce the same part of the tape or to reproduce the required part while skipping the unnecessary part.

In a tape recorder which is capable of performing a program reproducing function such as the music selection function as described above (or with only a skipping function for searching the beginning of songs), even though the REW operation plate 135 or the FF operation plate 137 is operated to detect the blank signals on the tape, the head chassis 21, unlike in the usual tape recorders, is not made to withdraw.

In reviewing or cueing, the search slider 23 cuts the take-up idler 272 or the like by withdrawing in place of the head chassis 21.

When the REW operation plate 135 or the FF operation plate 137 is operated for reviewing or cueing while the PLAY operation plate 136 is operated for reproducing, the tape recorder is placed under a condition wherein it is switched from the reproducing mode in the automatic repeat operation or in the forward music selection operation to the rewinding or fast forwarding operation. Although the program lever 435 is ultimately pivoted from its position wherein its left end is raised and its right end is lowered to the rewinding or fast forwarding position, in the process, the pin 435a of the program lever 435 withdraws the head chassis 21 to a waiting position. The search slider 23 is simultaneously withdrawn a greater distance than the withdrawal of the head chassis 21. This withdrawal of great magnitude of the search slider 23 may be converted to a pivoting force to cut the take-up idler 272 from the take-up side reel base 262 and the small gear part 281 of the intermediate pulley 28 by the pin 271 of the take-up slider 27.

The search slider 23 also serves to cut the take-up idler 272 in the pause operation. In the pause operation, the tape travel is temporarily stopped by operating the pause operation part 138 in the reproducing or recording condition. In the reproducing (recording) condition, since the head chassis 21 and the search slider 23 are displaced in their operating conditions, the pause control lever 44 one end of which engages their notches is pivoted in the clockwise direction from the position shown in FIG. 1 to a position wherein its left end is raised and its right end is lowered. Thus, when the pause operation plate 138 is separated, to pause control lever 44 is pivoted in the counterclockwise direction while its other end engages with the extension 138a of the pause operation plate 138. By this pivoting, the pause control lever 44 engages with the engaging piece 231 at the notched part of the search slider 23 so as to cut the take-up idler 272.

During this operation, the head chassis 21 is slightly withdrawn by the pivoting of the pause control lever 44, a head (not shown) is detached from the tape and in cooperation with this the pinch roller 45 is detached from the capstan 46, thereby completing a series of operations for pausing.

In reviewing and cueing, the head chassis 21 is withdrawn less than in the case of pausing so that the head is withdrawn for detecting blank signals.

The search slider 23 for performing functions as described above in a multi-functional tape recorder is structurally included for performing additional function such as cueing, reviewing and pausing and its effects are tremendous.

Quick reviewing and cueing as additional functions will be described. These are combinations of reviewing and cueing with recording. In particular, quick reviewing and cueing are a series of operations for preparing the tape recorder for reproduction by rewinding or fast forwarding the tape immediately after completion of the recording operation. They are accomplished by selectively operating in combination the REC operation plate 133, the PLAY operation plate 136 and the REW operation plate 135, or the FF operation plate 137. In order to perform the quick reviewing function, information is recorded within a predetermined range of the tape using a means such as a tape counter (not shown). The REW operation plate 135 is operated to release the REC operation plate 133 and to switch to rewinding. The REW operation plate 135 is released at the predetermined position of the tape being rewound to begin reproduction. In this case, measures are taken so that the PLAY operation plate 136 is not released when the REC operation plate 134 is released. This may be easily accomplished by changing the depth (height) of engagement of each operation plate with the locking plate 132.

In this case, since the music selection function can be performed unlike the case described hereinbefore, the head chassis 21 does not return to its original position. In cooperation with this, the locking condition is not released by the erroneous recording preventing lever 14. In this case, therefore, quick reviewing may not be possible.

In order to solve this problem so as to perform quick reviewing, the erroneous recording prevention lever control part 438a is disposed at the pointed end of the high speed system cutting lever 438 (FIG. 20). When the REC operation plate 135 is operated to perform quick reviewing while the REC operation plate 134 and the PLAY operation plate 136 are operated for recording, the tape recorder is placed, as in the case of the reviewing function, in a condition wherein it is switched from reproducing to rewinding in the automatic repeat operation. That is, the program lever 435 is pivoted in the counterclockwise direction from the position wherein its left end is raised and its right end is lowered to its ultimate rewinding position. In the process of this, the high speed system cutting lever 438 engaging with the pin 435a of the program lever 435 is pivoted in the clockwise direction from its position wherein its left end is lowered and its right end is raised so that the erroneous recording prevention lever control part 438a at the pointed end of the lever 438 pivots the pin $P_5$ of the erroneous recording prevention lever 14 in the same direction so as to release the REC operation plate 134 locked by the pin $P_6$. Since the REC operation plate 134 has already been released from being locked by the locking plate 132 when the REW operation plate 135 is operated, all of the double locks are released to return the operation plates to their unlocked conditions.

When the REC operation plate 134 is released for rewinding and the REW operation plate 136 is released thereafter (the REW operation plate will not be locked as in the reviewing operation), the operation mode is switched to the reproducing mode for performing the quick reviewing function through the same process in which the operation mode is switched from rewinding to reproduction in the automatic repeat operation. The process of switching from rewinding to reproduction, that is, the operation after the REW operation plate 136 is released is the same as in the case of reviewing so that it can be explained on the basis of the cueing function.

The quick cueing function is similar to the quick reviewing function if only the REW operation 135 is replaced by the FF operation plate 137 and the mutual switchability between rewinding and reproduction in the automatic repeat operation is replaced by the mutual switchability between fast forwarding and reproduction.

In the above operation, the head chassis 21 and the search slider 23 are slightly withdrawn as in the reviewing and cueing functions when the program lever 435 is pivoted in the counterclockwise direction. This withdrawal is not sufficient to release the lock of the pin $P_6$ by the pin $P_5$ of the erroneous recording prevention lever 14.

The control part 438a for controlling the erroneous recording prevention lever 14 for performing the quick reviewing function or the cueing function is formed integrally with the high speed system cutting lever 438 operable in cooperation with an operation mode switching mechanism such as the program lever 435 contributing to the multi-functional features. The driving source of the operation mode switching mechanism can be utilized effectively and functions added to the multi-functional features may be organically performed as well.

Next, considerations for eliminating undesirable fluttering components in a tape recorder mechanism as described above will be described. This is accomplished by setting the number of revolutions of various rotary bodies driven in the reproducing operation below that of the flywheel of the flywheel driving system which is a different system from the take-up driving system. The fluttering component increases as the number of revolutions of the various rotary bodies increases. Thus, the number of revolutions of the flywheel of the flywheel driving system different from the take-up driving system is maximized so that the number of revolutions of various rotary bodies driven in the reproducing condition will be below that of the flywheel for eliminating the fluttering component.

Accordingly, a tape recorder in accordance with this invention has a reproducing driving mechanism and a fast forwarding driving mechanism each cooperatively driven with the reproduction operation member and the fast forwarding operation member; a first and second switching members capable of taking two positions; and a control mechanism. The first and second switching members are mutually related through a biasing member by which the reproduction driving mechanism directly exerts a first biasing force and the fast forwarding mechanism exerts a second biasing force when both of the reproducing and fast forwarding members are put in operation. The control mechanism controls the switching members in the first and second positions in association with rotary bodies rotating independently of the tape travel and an electrical - mechanical converting mechanism which responds to a data blank detection signal obtained in a data part set in advance. In this control mechanism, in the first position, the fast forwarding driving mechanism is operated and the reproducing driving mechanism is switched to a waiting condition. In the second position, the reproducing driving mechanism is switched to a waiting position. Accordingly, it is possible to provide an improved program reproducing mechanism of a tape recorder which enables multi-data selection reproduction during forward travel of the tape, and which is simple in construction, suitable for multi-functional purposes, and easy to operate.

This invention is not limited to the cassette tape recorder described above and shown in the drawing. It may be generally applied to tape recorders (tape driving mechanisms) in audio equipment, calculators, and video cassette or open reel tape recorders.

What is claimed is:

1. In a tape recorder comprising:
   a tape reel driving mechanism;
   a reproduction driving mechanism and a fast feeding driving mechanism capable of being operably connected to said tape reel driving mechanism;
   a reproduction operation member and a fast feeding operation member which respectively operate said reproduction driving mechanism and said fast feeding driving mechanism and which are displaceable from inoperable positions to operable positions for performing a reproducing operation and a fast feeding operation;
   a locking mechanism for locking both of said operation members at operable positions;
   a tape travel mechanism for facilitating tape travel;
   a switching assembly displaceable between a first position to render said fast feeding driving mechanism operable and said reproduction driving mechanism inoperable and a second position to render said fast feeding driving mechanism inoperable and said reproduction driving mechanism operable;
   a rotary body for operably connecting with said switching member so as to perform said displacement of said switching member by its torque and to rotate independently of the tape travel; and
   an operating mechanism for automatically displacing said switching assembly in response to predetermined conditions in cooperation with said rotary body.

2. A tape recorder as set forth in claim 1 wherein said operating mechanism for driving said switching assembly has an automatic stop detection mechanism for detecting the end of a tape so as to displace said switching member from the second position to the first position.

3. A tape recorder as set forth in claim 2 wherein said automatic stop detection mechanism includes a locking mechanism operating member to engage with said locking mechanism to release said locking mechanism for displacing said reproducing operation member to an inoperable position upon detecting the end of said tape travel when said fast feeding operation member is in an inoperable position and said reproducing operation member is in an operable position; and to be disengaged from said locking mechanism upon detecting the end of said tape travel when both said fast feeding operation member and said reproducing operation member are in operable positions.

4. A tape recorder as set forth in claim 3 wherein said automatic stop detection mechanism includes a cam member rotating independently of said tape travel mechanism; a detection lever which is pivoted by the release of tape tension when the tape comes to an end and which engages with said cam member so as to be displaced in one direction along the longitudinal axis; an oscillating lever one end of which is received by said detection lever for pivoting in one direction when said detection lever is slid in said one direction; a spring for biasing said oscillating lever in the other direction; a transmission gear rotatably supported at the other end of said oscillating lever so as to engage with said tape travel mechanism, to be pivoted when said oscillating lever is pivoted in said one direction against the biasing force of said spring; a driving gear with a protruding driving pin for engaging with said transmission gear to be rotated thereby; and a slider driven by said driving gear, said slider being operable connected to said locking mechanism to be pivoted by said locking mechanism operation member so that it is unengageable with said locking mechanism when both said reproducing operation member and said fast feeding operation member are in an operable condition.

5. A tape recorder as set forth in any one of the preceding claims wherein said operating mechanism for driving said switching member has an electrical-mechanical converting mechanism for displacing said switching member from the second position to the first position by an outside signal related to the presence or absence of a portion on blank the tape.

6. A tape recorder as set forth in claim 5 wherein said fast feeding operation member has a rewinding operation member and a fast forwarding operation member and said fast feeding driving mechanism has a rewinding gear and a fast forwarding gear rotated by said tape travel mechanism.

7. In a tape recorder comprising:
 a tape reel driving mechanism;
a reproduction driving mechanism and a fast feeding driving mechanism capable of being operably connected to said tape reel driving mechanism;
a reproduction operation member and a fast feeding operation member which respectively operate said reproduction driving mechanism and said fast feeding driving mechanism and which are displaceable from inoperable position to operable positions for performing a reproducing operation and a fast feeding operation;
a locking mechanism for locking both of said operation members at operable positions;
a tape travel mechanism for facilitating tape travel;
means for generating a blank signal in response to the absence of data on the tape;
a switching assembly displaceable between a first position to render said fast feeding driving mechanism operable and said reproduction driving mechanism inoperable and a second position to render said fast feeding driving mechanism inoperable and said reproduction driving mechanism operable;
a rotary body for operably connecting with said switching member so as to perform said displacement of said switching member by its torque and to rotate independently of the tape travel; and
an operating mechanism for automatically displacing said switching assembly in response to said blank signal in cooperation with said rotary body.

8. In a tape recorder comprising:
a tape reel driving mechanism;
a reproduction driving mechanism and a fast feeding driving mechanism capable of being operably connected to said tape reel driving mechanism;
a reproduction operation member and a fast feeding operation member which respectively operate said reproduction driving mechanism and said fast feeding driving mechanism and which are displaceable from inoperable positions to operable positions for performing a reproducing operation and a fast feeding operation;
a locking mechanism for locking both of said operation members at operable positions;
a tape travel mechanism for facilitating tape travel;
a switching assembly displaceable between a first position to render said fast feeding driving mechanism operable and said reproduction driving mechanism inoperable and a second position to render said fast feeding driving mechanism inoperable and said reproduction driving mechanism operable;
a rotary body for operably connecting with said switching member so as to perform said displacement of said switching member so as to perform said displacement of said switching member by its torque and to rotate independently of the tape travel; and
a purely mechanical operating mechanism for automatically displacing said switching assembly in response to predetermined conditions in cooperation with said rotary body.

* * * * *